(12) United States Patent
Katahira et al.

(10) Patent No.: US 11,591,007 B2
(45) Date of Patent: Feb. 28, 2023

(54) GUIDE WHEEL SHOCK ABSORBING DEVICE, CARRIAGE, AND VEHICLE

(71) Applicant: Mitsubishi Heavy Industries Engineering, Ltd., Yokohama (JP)

(72) Inventors: Kousuke Katahira, Yokohama (JP); So Tamura, Yokohama (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 310 days.

(21) Appl. No.: 16/958,877

(22) PCT Filed: Jun. 7, 2018

(86) PCT No.: PCT/JP2018/021833
§ 371 (c)(1),
(2) Date: Jun. 29, 2020

(87) PCT Pub. No.: WO2019/155649
PCT Pub. Date: Aug. 15, 2019

(65) Prior Publication Data
US 2020/0339181 A1  Oct. 29, 2020

(30) Foreign Application Priority Data

Feb. 7, 2018 (JP) ............................. JP2018-020382

(51) Int. Cl.
*B62D 1/26* (2006.01)
*B61B 13/00* (2006.01)
*B61F 9/00* (2006.01)

(52) U.S. Cl.
CPC .............. *B62D 1/265* (2013.01); *B61B 13/00* (2013.01); *B61F 9/00* (2013.01)

(58) Field of Classification Search
None
See application file for complete search history.

(56) References Cited

U.S. PATENT DOCUMENTS

| 2,066,552 A | * | 1/1937 | Best | B60G 15/02 267/254 |
| 2,828,969 A | * | 4/1958 | Hoffman | B60G 7/008 280/5.521 |

(Continued)

FOREIGN PATENT DOCUMENTS

| JP | S511943 | * | 7/1976 | ............. B61B 13/00 |
| JP | S5191413 U | | 7/1976 | |

(Continued)

OTHER PUBLICATIONS

International Search Report and Written Opinion of International Application No. PCT/JP2018/021833 dated Aug. 21, 2018; 11pp.

*Primary Examiner* — Kavel Singh
(74) *Attorney, Agent, or Firm* — Kanesaka Berner and Partners LLP

(57) ABSTRACT

A guide wheel shock absorbing device includes an attachment arm, a shock absorbing link provided on the attachment arm and extending in one direction, a shock absorbing link support portion provided on the shock absorbing link and supporting the shock absorbing link in a state of being oscillatable with respect to the attachment arm, a guide wheel coming into contact with a guide rail laid on a traveling track of a vehicle, a guide wheel support portion provided on the shock absorbing link and supporting the guide wheel in a rotatable state, and a shock absorbing elastic portion elastically supporting the shock absorbing link with respect to the attachment arm. The shock absorbing elastic portion has first and second elastic bodies different in displacement with respect to a guide wheel load.

20 Claims, 15 Drawing Sheets

(56) References Cited

U.S. PATENT DOCUMENTS

| | | | |
|---|---|---|---|
| 9,849,892 B2* | 12/2017 | Tachibana | B62D 1/265 |
| 10,131,367 B2* | 11/2018 | Katahira | B61F 5/38 |
| 10,994,753 B2* | 5/2021 | Kanno | B61B 13/00 |
| 2012/0103227 A1 | 5/2012 | Maeyama et al. | |
| 2016/0023671 A1 | 1/2016 | Tachibana et al. | |

FOREIGN PATENT DOCUMENTS

| | | |
|---|---|---|
| JP | H11278004 A | 10/1999 |
| JP | 2007045321 A | 2/2007 |
| JP | 2011088512 A | 5/2011 |
| JP | 2015164824 A | 9/2015 |
| WO | 2014141971 A1 | 9/2014 |

* cited by examiner

GUIDE WHEEL SHOCK ABSORBING DEVICE, CARRIAGE, AND VEHICLE

RELATED APPLICATIONS

The present application is a National Phase of International Application Number PCT/JP2018/021833 filed Jun. 7, 2018 and claims priority to Japanese Application Number 2018-020382 filed Feb. 7, 2018.

TECHNICAL FIELD

The present invention relates to a guide wheel shock absorbing device, a carriage, and a vehicle.

Priority is claimed based on Japanese Patent Application No. 2018-020382 filed on Feb. 7, 2018, the content of which is incorporated herein by reference.

BACKGROUND ART

Known as new means of transportation other than buses or railways is a track-based transportation system that travels on a track by means of a traveling wheel made of a rubber tire or the like. In this type of track-based transportation system, which is generally called "new transportation system", guide wheels arranged in both side portions of a vehicle or the like are guided by guide rails provided along the track.

Specific examples of the new transportation system include an automated people mover (APM: fully automated unmanned driving vehicle) and intra-city automated guideway transit (AGT: automatic guide rail passenger transport system).

Such a vehicle has a guide wheel shock absorbing device provided with a guide wheel that rolls in contact with the inner surface of a guide rail laid on a track (see, for example, PTL 1).

The guide wheel shock absorbing device disclosed in PTL 1 includes an attachment arm, a shock absorbing link, a shock absorbing link support portion, a guide wheel support portion, and a shock absorbing elastic portion.

The attachment arm is attached to the vehicle and extends outward in the width direction of the vehicle. The shock absorbing link is provided at the tip of the attachment arm and extends in the traveling direction of the vehicle.

The shock absorbing link support portion is provided at one end of the shock absorbing link in the traveling direction of the vehicle. The shock absorbing link support portion has a first hole vertically penetrating one end of the shock absorbing link, a first rod inserted in the first hole, and a first elastic bush provided between the first rod and the first hole. The first rod is fixed to the attachment arm by a bolt.

The guide wheel support portion includes a rotary shaft provided at the other end of the shock absorbing link. The guide wheel support portion supports the guide wheel in a rotatable state.

The shock absorbing elastic portion is provided on the shock absorbing link positioned between the shock absorbing link support portion and the guide wheel support portion. The shock absorbing elastic portion is disposed near the guide wheel.

The shock absorbing elastic portion has a second hole vertically penetrating the shock absorbing link, a second rod inserted in the second hole, and a second elastic bush provided between the second rod and the second hole. The second rod is fixed to the attachment arm by a bolt.

CITATION LIST

Patent Literature

[PTL 1] Japanese Unexamined Patent Application Publication No. 2015-164824

SUMMARY OF INVENTION

Technical Problem

By the way, in the guide wheel shock absorbing device disclosed in PTL 1, the shock absorbing link positioned between the shock absorbing link support portion and the guide wheel support portion is provided with the shock absorbing elastic portion. The maximum displacement in this case is limited due to the configuration of the guide wheel shock absorbing device, and the second elastic bush needs to be hardened for a sufficiently large force of action from the guide rail to be completely absorbed within the range of displacement.

However, when the second elastic bush is hardened as described above, a decline in shock absorption capacity arises, and thus a problem arises in the form of ride comfort deterioration.

In this regard, an object of the present invention is to provide a guide wheel shock absorbing device, a carriage, and a vehicle capable of improving a passenger's ride comfort.

Solution to Problem

In order to solve the above problems, a guide wheel shock absorbing device according to one aspect of the present invention includes an attachment arm connected to a guide frame disposed below a vehicle body of a vehicle, a shock absorbing link provided on the attachment arm and extending in one direction, a shock absorbing link support portion provided on the shock absorbing link and supporting the shock absorbing link in a state of being oscillatable with respect to the attachment arm, a guide wheel receiving a frictional force and rolling by coming into contact with a guide rail laid on a traveling track of the vehicle, a guide wheel support portion provided on the shock absorbing link and supporting the guide wheel in a rotatable state, and a shock absorbing elastic portion elastically supporting the shock absorbing link with respect to the attachment arm, in which the shock absorbing elastic portion has a plurality of shock absorbing bodies different in displacement or displacement speed with respect to a load received by the guide wheel.

According to the present invention, the shock absorbing elastic portion having the plurality of shock absorbing bodies different in displacement or displacement speed with respect to a load is provided, and thus a small load can be absorbed by means of the shock absorbing body that is large in displacement or displacement speed in a case where the guide wheel receives the small load. On the other hand, in a case where the guide wheel receives a large load, the load can be absorbed by means of the shock absorbing body that is small in displacement or displacement speed. Accordingly, a passenger's ride comfort can be improved.

In addition, in the guide wheel shock absorbing device according to one aspect of the present invention, the shock absorbing elastic portion may include a first tubular member provided in a first hole penetrating the shock absorbing link, a first shaft body inserted into the first tubular member and fixed to the attachment arm, a distance adjustment member provided on a surface of an outer peripheral surface of the first shaft body, the surface facing an inner peripheral surface of the first tubular member, a first elastic body provided on an outer peripheral surface of the distance adjustment member facing the inner peripheral surface of the first tubular member and protruding to an inner peripheral surface side of the first tubular member beyond the first stopper portion, and a second elastic body provided so as to interconnect the outer peripheral surface of the first shaft body and the inner peripheral surface of the first tubular member, the plurality of shock absorbing bodies may include the first elastic body and the second elastic body, and the first elastic body may be higher in rigidity than the second elastic body.

The second elastic body (large-displacement shock absorbing body) interconnecting the outer peripheral surface of the first shaft body and the inner peripheral surface of the first tubular member and lower in rigidity than the first elastic body is provided as described above, and thus a small load can be absorbed by the second elastic body in a case where the guide wheel receives the small load.

In addition, the first elastic body (small-displacement shock absorbing body) higher in rigidity than the second elastic body is provided, and thus a large load can be absorbed by the first elastic body when the guide wheel receives the large load. Accordingly, a passenger's ride comfort can be improved.

In addition, by the distance adjustment member being provided, the distance adjustment member and the inner peripheral surface of the first tubular member can be brought into contact with each other in a case where the guide wheel receives a very large load or in a case where the first and second elastic bodies fail. In other words, the distance adjustment member is capable of functioning as a stopper. As a result, it is possible to suppress a substantial displacement of the position of the guide wheel with respect to the attachment arm.

In addition, the guide wheel shock absorbing device according to one aspect of the present invention may further have a first stopper portion provided at a part of a surface of the distance adjustment member and protruding to the inner peripheral surface side of the first tubular member, in which the first stopper portion may be smaller in protrusion amount than the first elastic body.

Two stoppers are provided by the first stopper portion having such a configuration, and thus the displacement of the guide wheel with respect to the attachment arm can be reliably controlled within a desired displacement range.

In addition, in the guide wheel shock absorbing device according to one aspect of the present invention, a shape of the distance adjustment member may be a ring shape circumferentially surrounding the outer peripheral surface of the first shaft body and a shape of the first stopper portion and a shape of the first elastic body may be ring shapes surrounding the outer peripheral surface of the distance adjustment member.

By the distance adjustment member, the first stopper portion, and the first elastic body having such shapes, the first stopper portion and the first elastic body are capable of functioning with respect to a load received from any radial direction of the first tubular member.

In addition, in the guide wheel shock absorbing device according to one aspect of the present invention, the shock absorbing elastic portion may include a first tubular member provided in a first hole penetrating the shock absorbing link, a first shaft body inserted into the first tubular member and fixed to the attachment arm, a pair of liquid sealing chambers provided in the first hole and filled with a liquid, a flow path formed so as to connect the pair of liquid sealing chambers, the liquid flowing through the flow path, and an elastic body provided so as to seal the pair of liquid sealing chambers between the first shaft body and the first tubular member and interconnecting an outer peripheral surface of the first shaft body and an inner peripheral surface of the first tubular member, and the plurality of shock absorbing bodies may include the elastic body absorbing the load when the load is small and a damping mechanism including the pair of liquid sealing chambers and the flow path and absorbing a large load unabsorbable by the elastic body.

By the elastic body and the damping mechanism being configured as described above, a small load can be absorbed by the elastic body in a case where the guide wheel receives the small load and a large load can be absorbed by the damping mechanism in a case where the guide wheel receives the large load. As a result, a passenger's ride comfort can be improved.

In addition, by means of the structure that includes the elastic body and the damping mechanism, it is possible to shift the resonance range of the elastic body to the lower frequency side and suppress the occurrence of resonance by reducing vibration transmissibility.

In addition, the guide wheel shock absorbing device according to one aspect of the present invention may further have a first stopper portion provided on a surface of the outer peripheral surface of the first shaft body, the surface facing the inner peripheral surface of the first tubular member.

By the first stopper portion being configured as described above, the first stopper portion and the inner peripheral surface of the first tubular member can be brought into contact with each other in a case where the guide wheel receives a very large load or in a case where the elastic body and the damping mechanism fail. As a result, it is possible to suppress a substantial displacement of the position of the guide wheel with respect to the attachment arm.

In addition, the guide wheel shock absorbing device according to one aspect of the present invention may further have an air chamber formed in the elastic body positioned around each liquid sealing chamber constituting the pair of liquid sealing chambers.

By the air chamber being configured as described above, it is possible to absorb the volume difference during a liquid movement from one liquid sealing chamber to the other liquid sealing chamber and it is possible to suppress an increase in rigidity by the liquid sealing chamber.

In addition, in the guide wheel shock absorbing device according to one aspect of the present invention, the pair of liquid sealing chambers may be disposed so as to face each other in a direction in which the guide wheel receives a load.

As described above, the pair of liquid sealing chambers are disposed so as to face each other in the direction in which the guide wheel receives the load. Accordingly, a guide wheel load can be more efficiently attenuated when the guide wheel load (branch wheel load and main guide wheel load) is received.

In addition, in the guide wheel shock absorbing device according to one aspect of the present invention, a throttle portion may be formed in the flow path.

With such a configuration, it is possible to impart resistance to a liquid during passage through the throttle portion as well as the flow path, and thus the load damping effect can be enhanced.

In addition, in the guide wheel shock absorbing device according to one aspect of the present invention, the flow path may have first and second flow paths connecting the pair of liquid sealing chambers.

The flow path connecting the pair of liquid sealing chambers includes the first and second flow paths as described above, and thus a damping force different from the damping force at a time when only one flow path is provided can be obtained.

In addition, in the guide wheel shock absorbing device according to one aspect of the present invention, the pair of liquid sealing chambers may have a first liquid sealing chamber and a second liquid sealing chamber and the guide wheel shock absorbing device may include a first valve opening and closing an end of the first flow path communicating with the second liquid sealing chamber and a second valve opening and closing an end of the second flow path communicating with the first liquid sealing chamber.

The first and second valves configured as described above are provided, and thus the first and second valves function as resistance when a liquid opens the first and second valves. Accordingly, a large damping force can be obtained as compared with a case where only the first and second flow paths are provided.

In addition, by the first and second valves that have the above-described configuration being provided, the first flow path can be used as a flow path for supplying the liquid in the first liquid sealing chamber to the second liquid sealing chamber and the second flow path can be used as a flow path for supplying the liquid in the second liquid sealing chamber to the first liquid sealing chamber.

In addition, in the guide wheel shock absorbing device according to one aspect of the present invention, the first valve may be opened by the liquid flowing through the first flow path in a direction from the first liquid sealing chamber toward the second liquid sealing chamber and the second valve may be opened by the liquid flowing through the second flow path in a direction from the second liquid sealing chamber toward the first liquid sealing chamber.

The first and second valves are capable of functioning as check valves by the first and second valves configured as described above being provided.

In addition, in the guide wheel shock absorbing device according to one aspect of the present invention, the first valve may have a first leaf spring opening and closing the end of the first flow path, the second valve may have a second leaf spring opening and closing the end of the second flow path, and the first and second leaf springs may be different in rigidity from each other.

Different damping forces can be obtained by the first and second leaf springs being different in rigidity from each other as described above.

In addition, in the guide wheel shock absorbing device according to one aspect of the present invention, the pair of liquid sealing chambers may have a first liquid sealing chamber and a second liquid sealing chamber, the first flow path may have a first large-diameter portion formed in an end portion on a first liquid sealing chamber side and larger in diameter than the other portion, the second flow path may have a second large-diameter portion formed in an end portion on a second liquid sealing chamber side and larger in diameter than the other portion, and the guide wheel shock absorbing device may include a first member disposed in the first large-diameter portion, movable in the first large-diameter portion, and larger than an inner diameter of the other portion of the first flow path, a first throttle portion formed at an end of the first large-diameter portion positioned on the first liquid sealing chamber side, a first spring disposed between the first member and the first throttle portion in the first large-diameter portion, a second member disposed in the second large-diameter portion, movable in the second large-diameter portion, and larger than an inner diameter of the other portion of the second flow path, a second throttle portion formed at an end of the second large-diameter portion positioned on the second liquid sealing chamber side, and a second spring disposed between the second member and the second throttle portion in the second large-diameter portion.

With such a configuration, it is possible to generate a damping force in the first flow path by the elastic force of the first spring acting when the fluid flowing through the first flow path presses the first member and the resistance generated when the fluid passes through the first throttle portion.

In addition, it is possible to generate a damping force in the second flow path by the elastic force of the second spring acting when the fluid flowing through the second flow path presses the second member and the resistance generated when the fluid passes through the second throttle portion.

Accordingly, the load damping effect can be enhanced as compared with a case where only the first and second flow paths having constant inner diameters are used.

In addition, in the guide wheel shock absorbing device according to one aspect of the present invention, the first and second springs may be different in rigidity from each other.

The damping force with respect to the branch wheel load and the damping force with respect to the main guide wheel load can be different from each other by the first and second springs being different in rigidity from each other as described above.

In addition, in the guide wheel shock absorbing device according to one aspect of the present invention, a second stopper portion may be provided on the outer peripheral surface of the first shaft body facing the inner peripheral surface of the first tubular member or the inner peripheral surface of the first tubular member.

By the second stopper portion being configured as described above, the second stopper portion and the inner peripheral surface of the first tubular member or the outer peripheral surface of the first shaft body can be brought into contact with each other in a case where the guide wheel receives a very large load or in a case where the first and second elastic bodies fail. As a result, it is possible to suppress a substantial displacement of the position of the guide wheel with respect to the attachment arm.

In addition, in the guide wheel shock absorbing device according to one aspect of the present invention, a notch portion may be formed in the attachment arm and the notch portion may be provided with a first bolt fixing the first shaft body to the attachment arm from a direction orthogonal to a direction in which the guide wheel receives a load.

With such a configuration, it is possible to receive the guide wheel load at the part where the notch portion and the first shaft body come into contact with each other in the direction in which the guide wheel load is received.

As a result, the guide wheel load is not directly applied to the first bolt (no tensile load is directly applied to the first bolt), and thus it is possible to suppress the occurrence of loosening of the first bolt or a failure of the first bolt.

In addition, in the guide wheel shock absorbing device according to one aspect of the present invention, the shock absorbing link support portion may include a second tubular member inserted into a second hole penetrating the shock absorbing link, a second shaft body inserted into the second tubular member and fixed to the attachment arm, a third stopper portion provided on an outer peripheral surface of the second shaft body facing an inner peripheral surface of the second tubular member or the inner peripheral surface of the second tubular member, a third elastic body provided between the second shaft body and the second tubular member and interconnecting the second shaft body and the second tubular member, and a second bolt fixing both end portions of the second shaft body to the shock absorbing link, and the second bolt may fix the second shaft body to the shock absorbing link from a direction orthogonal to a direction in which the guide wheel receives a load.

By the shock absorbing link support portion having the third stopper portion as described above, the third stopper portion and the second tubular member or the second shaft body can be brought into contact with each other in a case where the guide wheel receives a very large load or in a case where the first and second elastic bodies fail. As a result, it is possible to suppress a substantial displacement of the position of the guide wheel with respect to the attachment arm.

In addition, the second bolt fixes the second shaft body to the shock absorbing link from the direction orthogonal to the direction in which the guide wheel receives the load. Accordingly, it is possible to suppress detachment of the first shaft body from the notch portion even in a case where the first bolt is loose.

A carriage according to one aspect of the present invention may include the guide wheel shock absorbing device.

A passenger's ride comfort can be improved by means of the carriage having such a configuration.

A vehicle according to one aspect of the present invention may include the carriage and the vehicle body provided on the carriage.

A passenger's ride comfort can be improved by means of the vehicle having such a configuration.

Advantageous Effects of Invention

A passenger's ride comfort can be improved according to the present invention.

DESCRIPTION OF EMBODIMENTS

Hereinafter, embodiments to which the present invention is applied will be described in detail with reference to the drawings.

First Embodiment

A vehicle 10 according to a first embodiment will be described with reference to FIG. 1. The X direction in FIG. 1 indicates the width direction of the vehicle 10 (width direction of a shock absorbing link 27), and the Z direction in FIG. 1 indicates a vertical direction.

Figure 1:
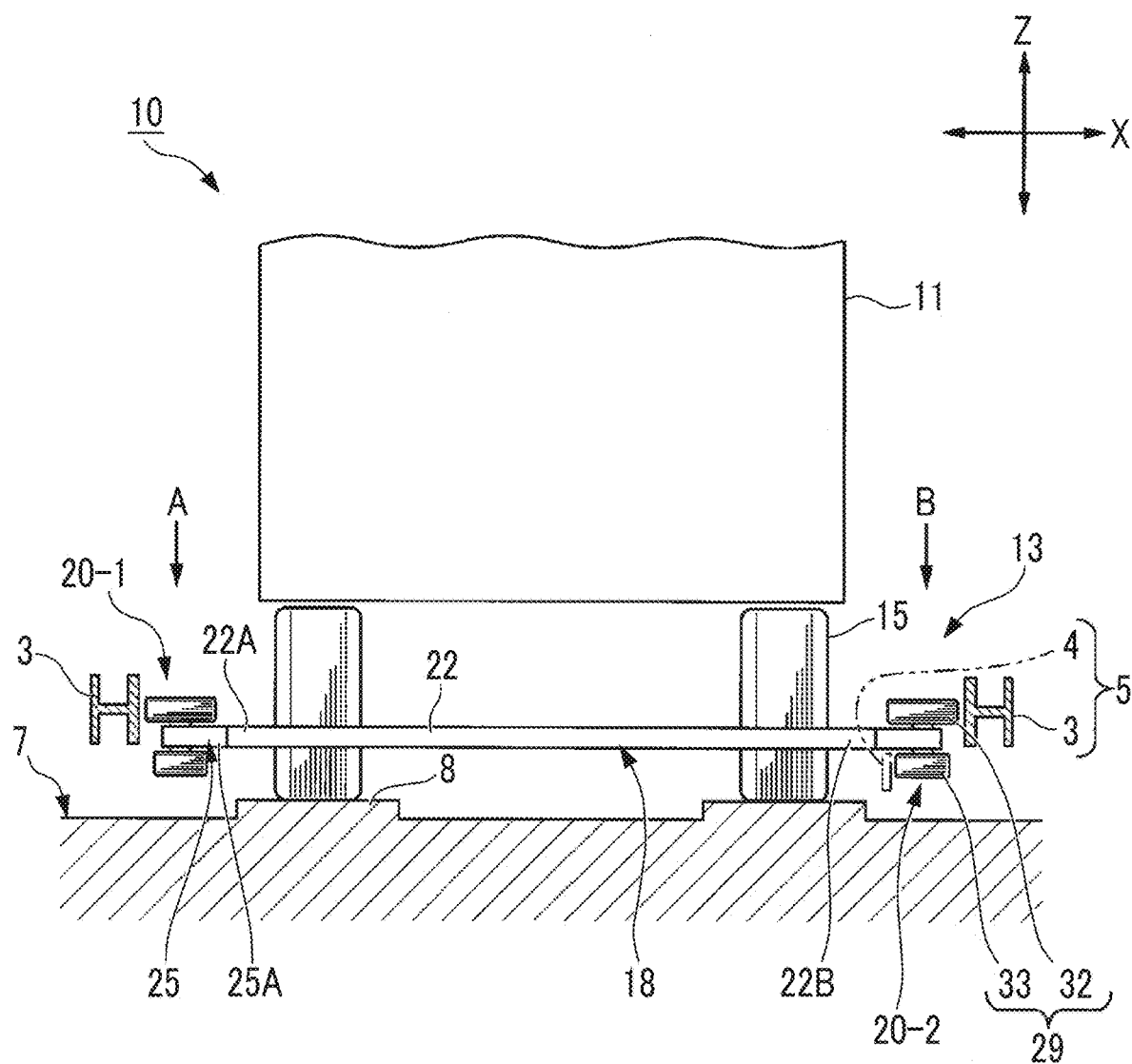
FIG. 1 is a front view illustrating a schematic configuration of a vehicle according to a first embodiment of the present invention.

Illustrated as an example of the vehicle 10 in FIG. 1 is a track-type vehicle guided by guide rails 5 and traveling on a traveling path 8 of a track 7. The guide rails 5 are provided on both width-direction sides of the track 7 and have main guide rails 3 and branch guide rails 4 disposed inside the main guide rails 3.

The vehicle 10 includes a vehicle body 11 and a carriage 13 (traveling carriage). The vehicle body 11 is disposed on the carriage 13. The vehicle body 11 is supported by the carriage 13.

The carriage 13 has traveling wheels 15, a suspension device (not illustrated) rotatably supporting an axle, a guide frame 18, and guide wheel shock absorbing devices 20-1 and 20-2.

The traveling wheels 15 are connected to both ends of the axle (not illustrated). A rubber tire or the like can be used as the traveling wheel 15.

The guide frame 18 is disposed below the vehicle body 11 and inside the guide wheel shock absorbing devices 20-1 and 20-2 disposed in the X direction. The guide frame 18 has a pair of cross beams 22 extending in the X direction and a pair of vertical beams (not illustrated) orthogonal to the cross beams 22.

The cross beams 22 are respectively disposed in front of and behind the vehicle body 11. The cross beam 22 has end portions 22A and 22B (both end portions) disposed in the X direction.

The pair of vertical beams are provided between the pair of cross beams 22. The pair of vertical beams connect the pair of cross beams 22.

Next, the guide wheel shock absorbing devices 20-1 and 20-2 will be described with reference to FIGS. 1 to 7.

Figure 2:
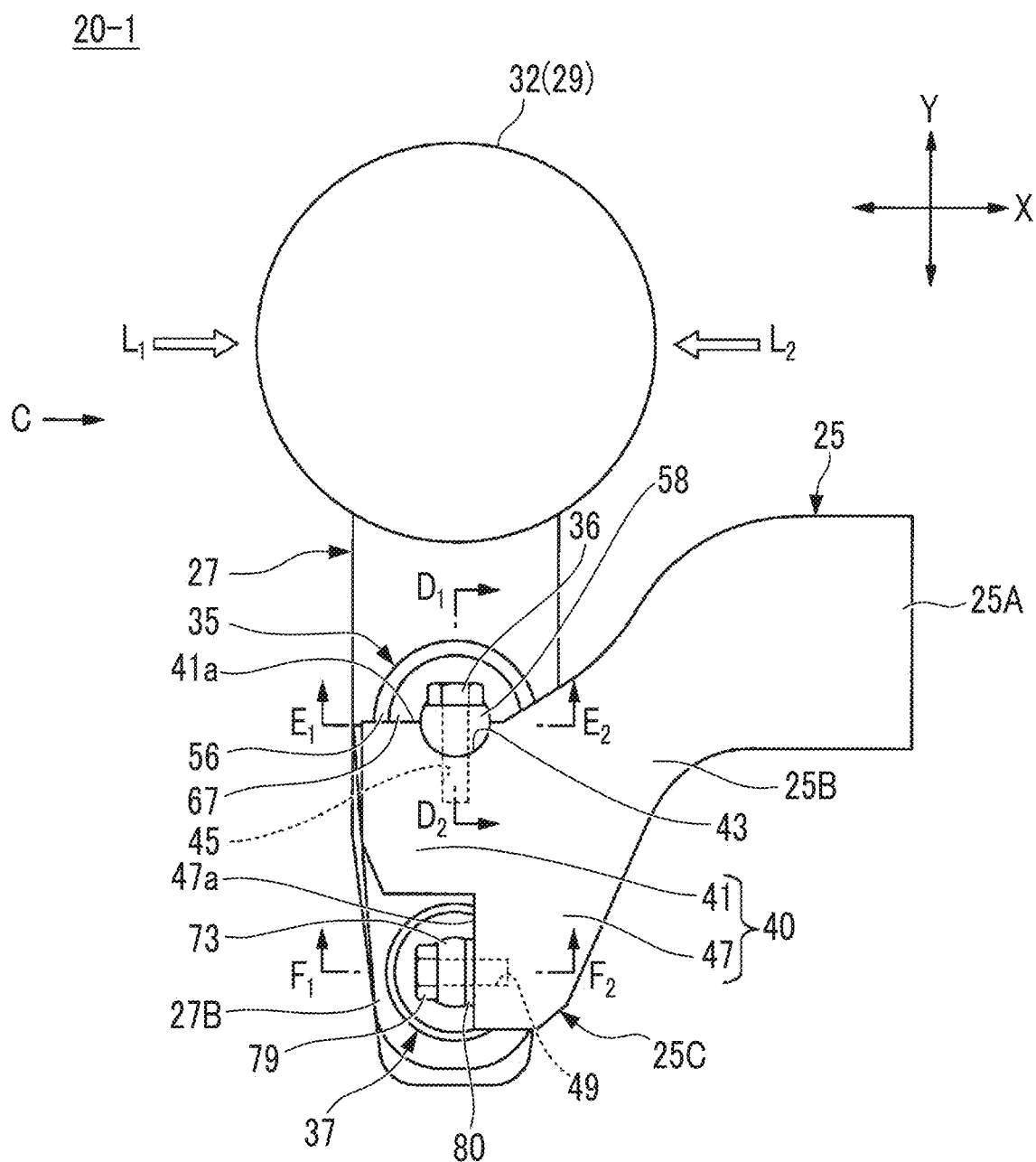
FIG. 2 is a plan view of one guide wheel shock absorbing device illustrated in FIG. 1 as viewed from A.

The Y direction in FIG. 2 indicates the traveling direction of the vehicle 10 (longitudinal direction of the shock absorbing link 27) orthogonal to the X direction and the Z direction illustrated in FIG. 1, L1 in FIG. 2 indicates a main guide wheel load applied in an arrow direction (hereinafter, referred to as "main guide wheel load L1"), and L2 in FIG. 2 indicates a branch wheel load applied in an arrow direction (hereinafter, referred to as "branch wheel load L2").

It should be noted that at least one of the main guide wheel load L1 and the branch wheel load L2 may be referred to as "guide wheel load" in a case where at least one of the main guide wheel load L1 and the branch wheel load L2 is indicated in the following description.

In FIGS. 1 to 7, the same components are denoted by the same reference numerals.

The guide wheel shock absorbing device 20-1 is provided in the end portion 22A of the cross beam 22. The guide wheel shock absorbing device 20-1 has an attachment arm 25, the shock absorbing link 27, a guide wheel support portion 30 including a shaft body 28, a main guide wheel 32 and a branch wheel 33 as guide wheels 29, a shock absorbing elastic portion 35, a first bolt 36, and a shock absorbing link support portion 37.

The attachment arm 25 extends outward in the width direction of the vehicle 10. The attachment arm 25 has a base end portion 25A, a connecting portion 25B, and a tip portion 25C. The base end portion 25A is connected to the end portion 22A of the cross beam 22. The connecting portion 25B is disposed between the base end portion 25A and the tip portion 25C and connects the base end portion 25A and the tip portion 25C to each other.

The tip portion 25C is configured by two plate-shaped members 40 disposed apart from each other in the Z direction. A part of the shock absorbing link 27 is accommodated between the two plate-shaped members 40.

The plate-shaped member 40 has a first protrusion portion 41, a notch portion 43, a first bolt hole 45, a second protrusion portion 47, and a second bolt hole 49.

The first protrusion portion 41 protrudes in the X direction away from the connecting portion 25B. A pair of the first protrusion portions 41 disposed in the Z direction accommodate the central portion of the shock absorbing link 27. The first protrusion portion 41 has a surface 41a facing the main guide wheel 32 in the Y direction. A flat surface orthogonal to the Y direction or the like can be used as the surface 41a.

The notch portion 43 is provided in the first protrusion portion 41. The notch portion 43 is formed by the first protrusion portion 41 being notched in the Y direction from the main guide wheel 32 toward the first protrusion portion 41 (longitudinal direction of the shock absorbing link 27).

The shape of the notch portion 43 allows the notch portion 43 to come into contact with an outer peripheral surface 58c of the end portion of a first shaft body 58 that constitutes the shock absorbing elastic portion 35. The notch portion 43 accommodates a part of the upper or lower end portion of the first shaft body 58.

The first bolt hole 45 penetrates the end portion of the first shaft body 58 and is formed so as to have a tip portion reaching the first protrusion portion 41. The first bolt hole 45 extends in the Y direction.

The second protrusion portion 47 protrudes in the Y direction away from the main guide wheel 32. A pair of the second protrusion portions 47 disposed in the Z direction accommodate a part of the other end portion of the shock absorbing link 27. The second protrusion portion 47 has a surface 47a facing the main guide rail 3. A flat surface orthogonal to the X direction or the like can be used as the surface 47a.

The second bolt hole 49 penetrates the end portion of a second shaft body 73 that constitutes the shock absorbing link support portion 37 and is formed so as to have a tip portion reaching the second protrusion portion 47. The second bolt holes 49 are respectively formed in the upper and lower end portions of the second shaft body 73. The second bolt hole 49 extends in the X direction.

The shock absorbing link 27 is a plate-shaped member extending in the Y direction (one direction) and has one end portion 27A, the other end portion 27B, a through-hole 51, a first hole 52, and a second hole 53.

The one end portion 27A is an end portion corresponding to the region where the guide wheel 29 is disposed. The other end portion 27B is an end portion positioned near the second protrusion portion 47.

The through-hole 51 is provided in the one end portion 27A of the shock absorbing link 27. The through-hole 51 penetrates the one end portion 27A in the Z direction.

The first hole 52 is provided in the central portion of the shock absorbing link 27. The first hole 52 penetrates the central portion of the shock absorbing link 27 in the Z direction.

The second hole 53 is provided in the other end portion 27B of the shock absorbing link 27. The second hole 53 penetrates the other end portion 27B in the Z direction.

The guide wheel support portion 30 has the shaft body 28 and a bearing (not illustrated) disposed between the shaft body 28 and the main guide wheel 32 and branch wheel 33.

The shaft body 28 is inserted in the through-hole 51 so as to have upper and lower end portions protruding from the shock absorbing link 27.

The main guide wheel 32 is provided in the upper end portion of the shaft body 28 via the bearing (not illustrated). The main guide wheel 32 has an outer peripheral surface 32a coming into contact with the main guide rail 3. The main guide wheel 32 receives a frictional force and rolls by coming into contact with the main guide rail 3. At this time, the main guide wheel load L1 is applied to the main guide wheel 32 as illustrated in FIG. 2.

The branch wheel 33 is provided in the lower end portion of the shaft body 28 via the bearing (not illustrated). The outer diameter of the branch wheel 33 is configured to be smaller than the outer diameter of the main guide wheel 32.

The branch wheel 33 has an outer peripheral surface 33a coming into contact with the branch guide rail 4 in branching. The branch wheel 33 receives a frictional force and rolls by coming into contact with the branch guide rail 4. At this time, the branch wheel load L2 is applied to the branch wheel 33 as illustrated in FIG. 2.

It should be noted that the branch wheel load L2 that is very large is applied to the branch wheel 33 at the moment of switching from the state where the main guide wheel 32 and the main guide rail 3 are in contact with each other to the state where the branch wheel 33 and the branch guide rail 4 are in contact with each other.

The shock absorbing elastic portion 35 has a first tubular member 56, the first shaft body 58, a distance adjustment member 61, a first stopper portion 63, and first and second elastic bodies 65 and 67 as a plurality of shock absorbing bodies.

The first tubular member 56 is provided in the first hole 52. The outer peripheral surface of the first tubular member 56 is in contact with the shock absorbing link 27 partitioning the second hole 53. A metallic tubular member or the like can be used as the first tubular member 56.

The first shaft body 58 is inserted in the first tubular member 56 so as to have upper and lower end portions protruding from the first tubular member 56.

The first shaft body 58 has bolt notch portions 58A and 58B. The bolt notch portion 58A is provided in the upper end portion of the first shaft body 58. A part of the first bolt hole 45 described above is formed in the bolt notch portion 58A.

The bolt notch portion 58A has an abutment surface 58a coming into contact with a head portion 36A of the first bolt 36. The abutment surface 58a is a flat surface orthogonal to the Y direction.

The bolt notch portion 58B is provided in the lower end portion of the first shaft body 58. A part of the first bolt hole 45 is formed in the bolt notch portion 58B.

The bolt notch portion 58B has an abutment surface 58b coming into contact with the head portion 36A of the first bolt 36. The abutment surface 58b is a flat surface orthogonal to the Y direction.

The first shaft body 58 having the above-described configuration is fixed to the first protrusion portion 41 by the first bolt 36 in a state where the upper and lower end portions of the first shaft body 58 are partially accommodated in the notch portion 43 and the outer peripheral surface 58c of the first shaft body 58 and the first protrusion portion 41 partitioning the notch portion 43 are in contact with each other.

With such a configuration, it is possible to receive the guide wheel load at the part where the first shaft body 58 and the notch portion 43 come into contact with each other in the X direction.

As a result, the guide wheel load is not directly applied to the first bolt 36 (no tensile load is directly applied to the first bolt 36), and thus it is possible to suppress the occurrence of loosening of the first bolt 36 or a failure of the first bolt 36.

The distance adjustment member 61 is provided on the surface of the outer peripheral surface 58c of the first shaft body 58 that faces an inner peripheral surface 65a of the first tubular member 56. The distance adjustment member 61 has a uniform radial thickness.

The distance adjustment member 61 has an outer peripheral surface 61a facing an inner peripheral surface 56a of the first tubular member 56. The first elastic body 65 and the first stopper portion 63 are disposed on the outer peripheral surface 61a.

By the distance adjustment member 61 having such a configuration, the distance adjustment member 61 and the inner peripheral surface 56a of the first tubular member 56 can be brought into contact with each other in a case where the guide wheel 29 receives a very large load or in a case where the first stopper portion 63 and the first elastic body 65 fail. In other words, the distance adjustment member 61 is capable of functioning as a stopper. As a result, it is possible to suppress a substantial displacement of the position of the guide wheel 29 with respect to the attachment arm 25.

A space for disposing the first stopper portion 63 and the first elastic body 65 is formed between the outer peripheral surface 61a and the inner peripheral surface 56a.

The shape of the distance adjustment member 61 can be, for example, a ring shape circumferentially surrounding the outer peripheral surface 58c of the first shaft body 58. In this case, a metallic ring-shaped member or the like can be used as the distance adjustment member 61.

The first stopper portion 63 is provided above the outer peripheral surface 61a of the distance adjustment member 61. As a result, the first stopper portion 63 protrudes in the direction toward the inner peripheral surface 56a of the first tubular member 56. A first gap G1 is formed between the first stopper portion 63 and the inner peripheral surface 56a of the first tubular member 56.

The first stopper portion 63 comes into contact with the inner peripheral surface 56a of the first tubular member 56 when a large guide wheel load is received by the guide rail 5 and the guide wheel 29 coming into contact with each other.

The first stopper portion 63 having such a configuration can be similar in effect to the distance adjustment member 61 described above. In addition, since the first stopper portion 63 is provided on the outer peripheral surface 61a of the distance adjustment member 61, the position of the guide wheel 29 with respect to the attachment arm 25 can be regulated in a range narrower than the distance adjustment member 61.

The shape of the first stopper portion 63 can be, for example, a ring shape circumferentially surrounding the outer peripheral surface 61a of the distance adjustment member 61. In this case, a metallic ring-shaped member or the like can be used as the first stopper portion 63.

The first elastic body 65 is provided below the outer peripheral surface 61a of the distance adjustment member 61. The first elastic body 65 is a shock absorbing body with little displacement. The first elastic body 65 is an elastic body higher in rigidity than the second elastic body 67.

The first elastic body 65 protrudes to the inner peripheral surface 56a side of the first tubular member 56 beyond the first stopper portion 63. A second gap G2 narrower than the first gap G1 is formed between the first elastic body 65 and the inner peripheral surface 56a of the first tubular member 56.

When a large guide wheel load is applied to the guide wheel shock absorbing device 20-1, the first elastic body 65 comes into contact with the inner peripheral surface 56a of the first tubular member 56 before the first stopper portion 63 and the inner peripheral surface 56a of the first tubular member 56 come into contact with each other.

The first elastic body 65 absorbs a large guide wheel load when the guide wheel 29 receives the large guide wheel load.

The second elastic bodies 67 are respectively provided above and below the distance adjustment member 61 so as to interconnect the outer peripheral surface 58c of the first shaft body 58 and the inner peripheral surface 56a of the first tubular member 56.

As a result, the second elastic body 67 is disposed so as to sandwich the distance adjustment member 61 from the Z direction in a state where the second elastic body 67 is separated from the distance adjustment member 61, the first stopper portion 63, and the first elastic body 65. The second elastic body 67 is an elastic body larger in displacement than the first elastic body 65. In other words, the second elastic body 67 is an elastic body lower in rigidity than the first elastic body 65.

The second elastic body 67 absorbs a small guide wheel load when the small guide wheel load is applied to the guide wheel shock absorbing device 20-1.

Rubber different in rigidity (such as nitrile rubber) or the like can be used as the materials of the first and second elastic bodies 65 and 67.

In the shock absorbing elastic portion 35 having the above-described configuration, a smaller guide wheel load is absorbed by the second elastic body 67 when the small guide wheel load is applied to the guide wheel shock absorbing device 20-1.

In addition, in a case where a large guide load is applied to the guide wheel 29, the large guide wheel load is absorbed by the first elastic body 65 by the first elastic body 65 and the first tubular member 56 coming into contact with each other.

Further, in a case where a guide wheel load having a magnitude that is difficult for the first elastic body 65 to receive is applied to the guide wheel 29, a substantial displacement of the position of the guide wheel 29 with respect to the attachment arm 25 is suppressed by the first stopper portion 63 and the first tubular member 56 coming into contact with each other.

The shock absorbing link support portion 37 supports the shock absorbing link 27 in a state of being oscillatable with respect to the attachment arm 25. The shock absorbing link support portion 37 has a second tubular member 72, the second shaft body 73, a third stopper portion 75, a third elastic body 77, a second bolt 79, and an adjustment liner 80.

The second tubular member 72 is provided in the second hole 53. The second tubular member 72 is in contact with the shock absorbing link 27 partitioning the second hole 53. A metallic tubular member or the like can be used as the second tubular member 72.

The second shaft body 73 is inserted in the second tubular member 72 so as to have upper and lower end portions protruding from the second tubular member 72.

The second bolt hole 49 described above, an abutment notch portion 81, and a bolt notch portion 82 are respectively formed in the upper and lower end portions (both end portions) of the second shaft body 73.

The abutment notch portion 81 and the bolt notch portion 82 are formed by a part of the second shaft body 73 being notched. The abutment notch portion 81 and the bolt notch portion 82 are disposed so as to face each other in the X direction.

The abutment notch portion 81 has a flat surface 81a orthogonal to the X direction and coming into contact with the second protrusion portion 47. The abutment notch portion 81 is a notch portion formed for surface contact between the second shaft body 73 and the second protrusion portion 47.

The bolt notch portion 82 has a flat surface 82a orthogonal to the X direction and coming into contact with a head portion 79A of the second bolt 79. The bolt notch portion 82 is a notch portion formed for surface contact between the second shaft body 73 and the head portion 79A of the second bolt 79.

The third stopper portion 75 is provided below the second shaft body 73. The third stopper portion 75 is disposed so as to surround the outer peripheral surface of the lower portion of the second shaft body 73. A third gap G3 is formed between the third stopper portion 75 and the second tubular member 72.

A ring-shaped metallic member or the like can be used as the third stopper portion 75.

By the third stopper portion 75 having such a configuration, the third stopper portion 75 and the inner peripheral surface of the second tubular member 72 can be brought into contact with each other in a case where the guide wheel 29 receives a very large guide wheel load or in a case where the first and second elastic bodies 65 and 67 fail. As a result, it is possible to suppress a substantial displacement of the position of the guide wheel 29 with respect to the attachment arm 25.

The third elastic body 77 is provided so as to embed the part of the gap between the second tubular member 72 and the second shaft body 73 that is disposed above the third stopper portion 75. As a result, the third elastic body 77 radially interconnects the second tubular member 72 and the second shaft body 73.

The second bolt 79 has a shaft portion disposed in the second bolt hole 49. As a result, the second bolt 79 fixes both end portions (upper and lower end portions) of the second shaft body 73 to the second protrusion portion 47 from a direction orthogonal to the first bolt 36.

By the second bolt 79 fixing the second shaft body 73 to the shock absorbing link 27 from a direction orthogonal to the first bolt 36 in this manner, it is possible to suppress detachment of the first shaft body 58 from the notch portion 43 even in a case where the first bolt 36 is loose.

The adjustment liner 80 is disposed between the surface 47a of the second protrusion portion 47 and the end portions (upper and lower end portions) of the second shaft body 73.

By the adjustment liner 80 having such a configuration, it is possible to easily adjust the outer width of the guide wheel 29 by inserting and removing the adjustment liner 80 between the surface 47a of the second protrusion portion 47 and the end portions of the second shaft body 73.

Next, the guide wheel shock absorbing device 20-2 will be described. The guide wheel shock absorbing device 20-2 is similar in configuration to the guide wheel shock absorbing device 20-1 described above except that the attachment arm 25 illustrated in FIG. 2 is turned upside down and the second shaft body 73 is fixed to the second protrusion portion 47 from the direction opposite to the second bolt 79 illustrated in FIG. 2.

According to the guide wheel shock absorbing devices 20-1 and 20-2 of the first embodiment, the first and second elastic bodies 65 and 67 different in displacement with respect to a load are provided, and thus a small load can be absorbed by means of the large-displacement second elastic body 67 in a case where the guide wheel 29 receives the small load.

On the other hand, in a case where the guide wheel 29 receives a large load, the load can be absorbed by means of the small-displacement first elastic body 65. As a result, a passenger's ride comfort can be improved.

In addition, according to the carriage 13 having the guide wheel shock absorbing devices 20-1 and 20-2 and the vehicle 10 having the carriage 13, effects similar to those of the shock absorbing elastic portion 35 described above can be obtained.

It should be noted that the third stopper portion 75 may be provided on the inner peripheral surface of the second tubular member 72 although a case where the second shaft body 73 is provided with the third stopper portion 75 has been described as an example in the first embodiment.

Figure 8:
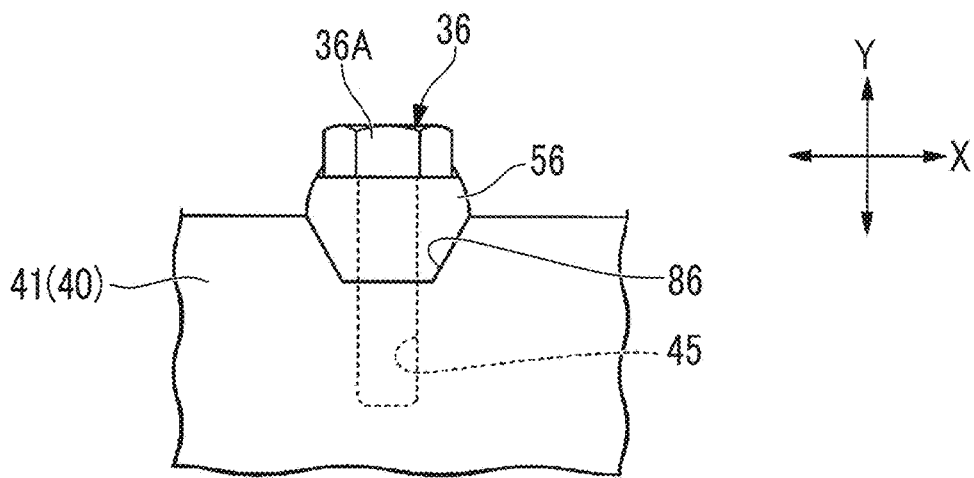
FIG. 8 is a plan view for describing another example of a notch portion.

In addition, although the notch portion 43 (see FIG. 2) having a semicircular shape in a plan view has been described as an example in the first embodiment, the notch portion 43 may be replaced with, for example, a notch portion 86 having a trapezoidal shape in a plan view as illustrated in FIG. 8 and the upper and lower end portions of the first shaft body 58 may correspond in shape to the notch portion 86.

By the notch portion 86 having such a shape, it is possible to make it difficult for the first shaft body 58 to detach from the notch portion 86.

Second Embodiment

Figure 9:
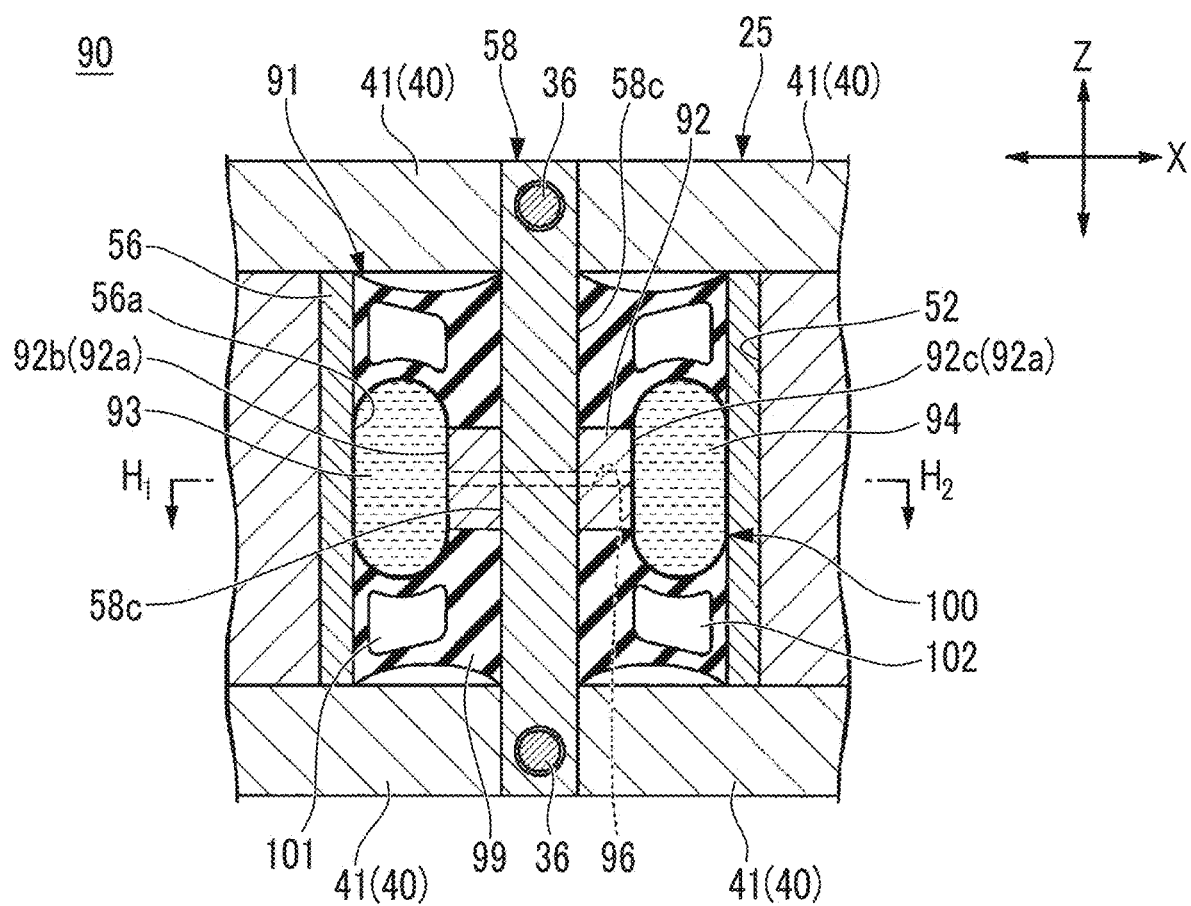
FIG. 9 is a cross-sectional view of a principal section of a guide wheel shock absorbing device according to a second embodiment of the present invention.
Figure 10:
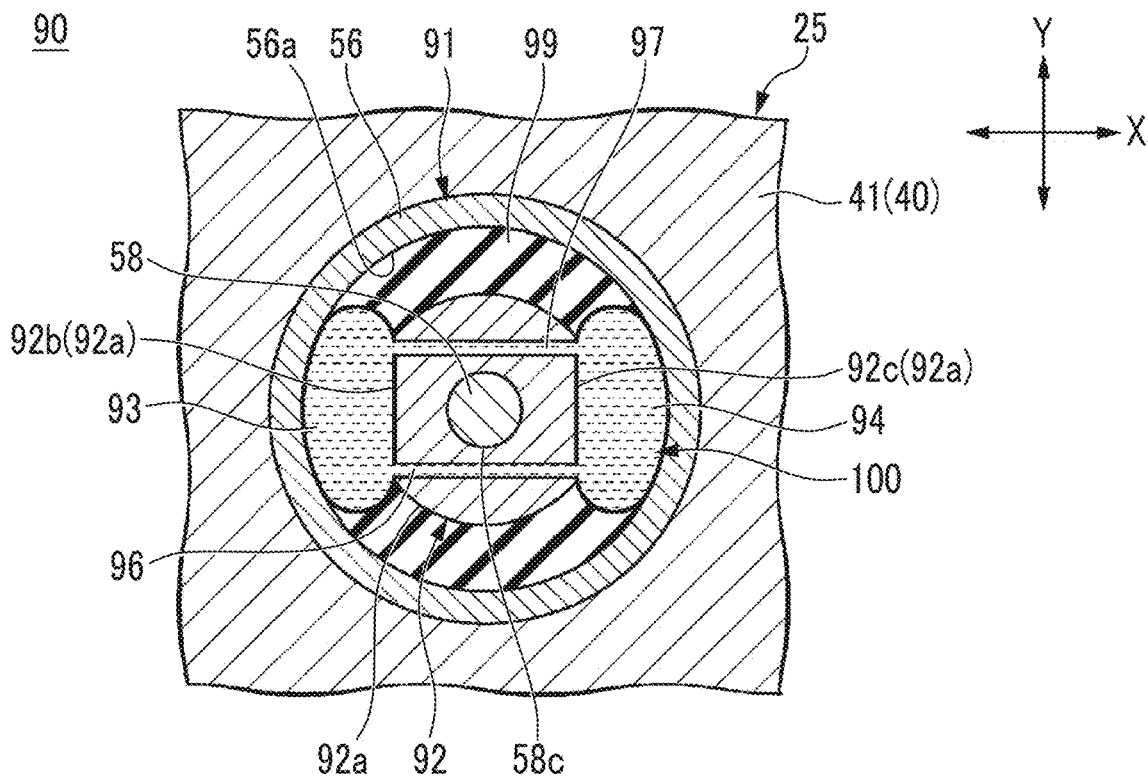
FIG. 10 is a cross-sectional view of the structure in FIG. 9 taken along line H1-H2.

A guide wheel shock absorbing device 90 according to a second embodiment will be described with reference to FIGS. 9 and 10. Only a principal section of the guide wheel shock absorbing device 90 (part different from the guide wheel shock absorbing device 20-1 of the first embodiment) is illustrated in FIGS. 9 and 10.

The guide wheel shock absorbing device 90 according to the second embodiment is similar in configuration to the guide wheel shock absorbing devices 20-1 and 20-2 except that the guide wheel shock absorbing device 90 has a shock absorbing elastic portion 91 instead of the shock absorbing elastic portion 35 constituting the guide wheel shock absorbing devices 20-1 and 20-2 of the first embodiment.

The shock absorbing elastic portion 91 is similar in configuration to the shock absorbing elastic portion 35 except that the shock absorbing elastic portion 91 has a first stopper portion 92, first and second liquid sealing chambers 93 and 94 as a pair of liquid sealing chambers, a first flow path 96, a second flow path 97, an elastic body 99, a first air chamber 101, and a second air chamber 102 instead of the distance adjustment member 61, the first stopper portion 63, the first elastic body 65, and the second elastic body 67 constituting the shock absorbing elastic portion 35.

The first stopper portion 92, which is a ring-shaped stopper, is provided on the outer peripheral surface 58c positioned in the central portion of the first shaft body 58. The first stopper portion 92 has an outer peripheral surface 92a facing the inner peripheral surface 56a of the first tubular member 56.

The outer peripheral surface 92a has liquid sealing chamber placement surfaces 92b and 92c. The liquid sealing chamber placement surfaces 92b and 92c are flat surfaces facing each other in the X direction.

When the entire liquid in the first liquid sealing chamber 93 (or the second liquid sealing chamber 94) has been moved into the second liquid sealing chamber 94 (or the first liquid sealing chamber 93), the first stopper portion 92 comes into contact with the inner peripheral surface 56a of the first tubular member 56. As a result, the first stopper portion 92 regulates the position of the guide wheel 29 (see FIGS. 2 and 3) with respect to the attachment arm 25.

The first liquid sealing chamber 93 is provided on the liquid sealing chamber placement surface 92b in contact with the inner peripheral surface 56a of the first tubular member 56. In other words, the first liquid sealing chamber 93 is disposed between the first stopper portion 92 and the first tubular member 56.

The second liquid sealing chamber 94 is provided on the liquid sealing chamber placement surface 92c in contact with the inner peripheral surface 56a of the first tubular member 56. In other words, the second liquid sealing chamber 94 is disposed between the first stopper portion 92 and the first tubular member 56. The second liquid sealing chamber 94 communicates with the first liquid sealing chamber 93 via the first and second flow paths 96 and 97.

The first and second liquid sealing chambers 93 and 94 are shock absorbing bodies having a low displacement speed. The first and second liquid sealing chambers 93 and 94 are filled with a liquid. Silicone oil, liquid silicone rubber, or the like can be used as the liquid.

The first and second flow paths 96 and 97 are formed so as to penetrate, in the X direction, the first stopper portion 92 positioned between the first liquid sealing chamber 93 and the second liquid sealing chamber 94. The first and second flow paths 96 and 97 have one end communicating with the first liquid sealing chamber 93 and the other end communicating with the second liquid sealing chamber 94. The first and second flow paths 96 and 97 are narrow flow paths.

Figure 3:
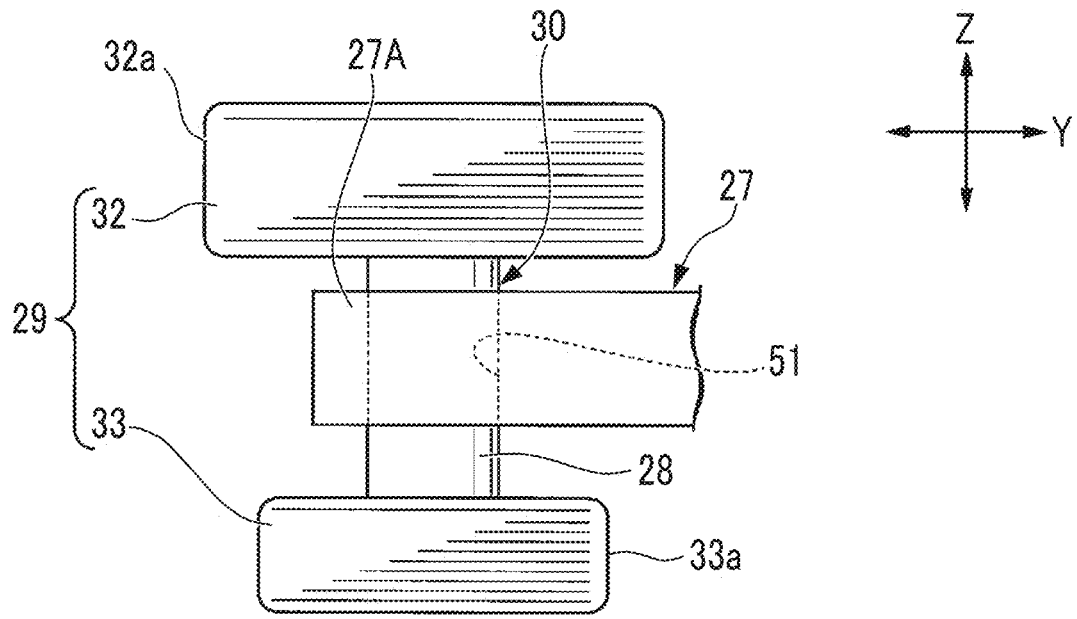
FIG. 3 is a C-view diagram of the part that corresponds to a guide wheel in the guide wheel shock absorbing device illustrated in FIG. 2.
Figure 4:
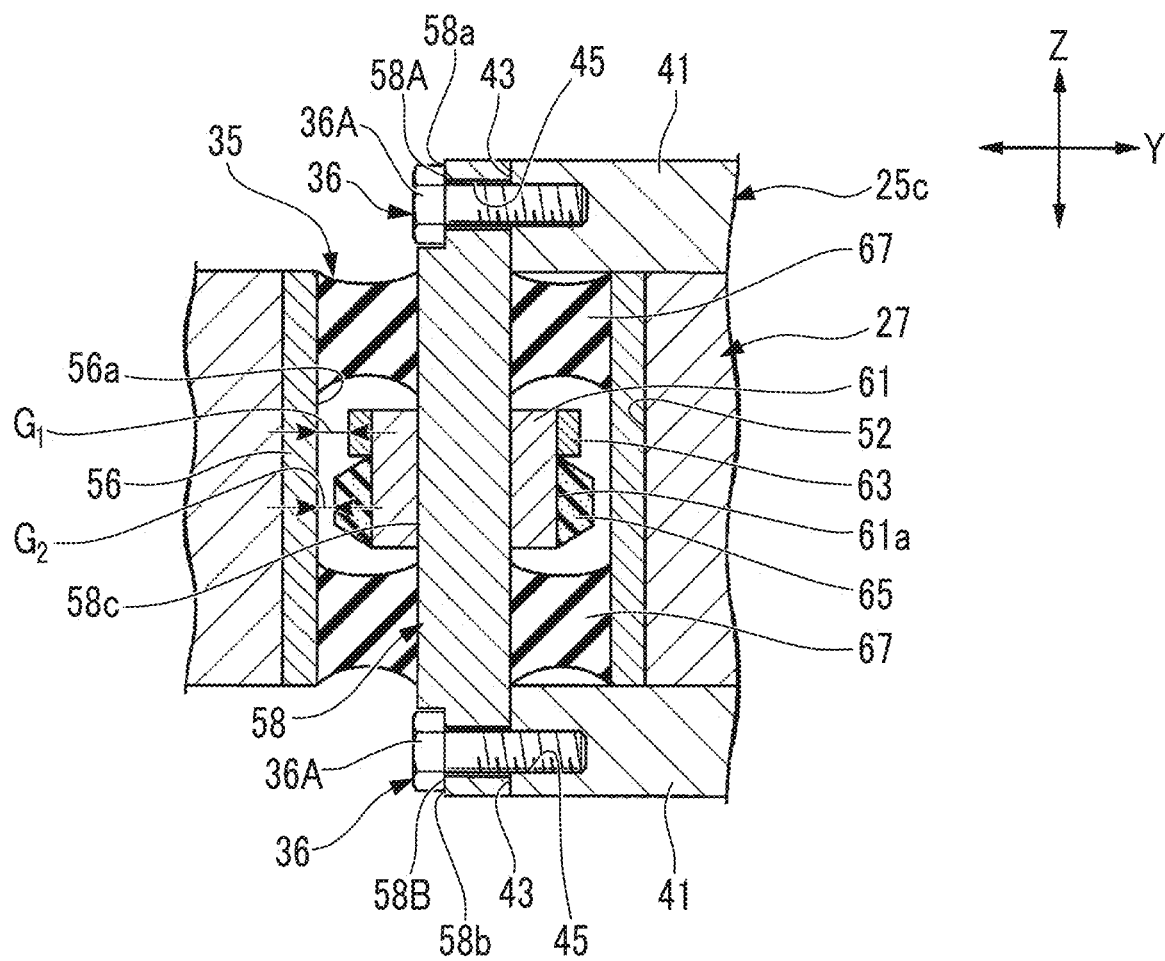
FIG. 4 is a cross-sectional view of the guide wheel shock absorbing device in FIG. 2 taken along line D1-D2.

When the guide wheel 29 illustrated in FIG. 3 receives a large guide wheel load, the first and second flow paths 96 and 97 move the liquid from the first liquid sealing chamber 93 (or the second liquid sealing chamber 94) to the second liquid sealing chamber 94 (or the first liquid sealing chamber 93).

At this time, the liquid moving through the narrow first and second flow paths 96 and 97 receives resistance, and thus the large guide wheel load can be attenuated.

In other words, the guide wheel shock absorbing device 90 of the second embodiment has a damping mechanism 100 including the first liquid sealing chamber 93, the second liquid sealing chamber 94, the first flow path 96, and the second flow path 97. The damping mechanism 100 absorbs a load larger than the load that can be absorbed by the elastic body 99.

The elastic body 99 is provided so as to seal the first and second liquid sealing chambers 93 and 94 and the first stopper portion 92 between the first shaft body 58 and the first tubular member 56. The elastic body 99 interconnects the outer peripheral surface 58c of the first shaft body 58 and the inner peripheral surface 56a of the first tubular member 56.

The elastic body 99, which is a shock absorbing body having a large displacement, easily exhibits a load absorption effect with respect to a small load as compared with the damping mechanism 100.

Although the damping mechanism 100 initially receives a small guide wheel load when the guide wheel 29 receives the load, the damping mechanism 100 is unlikely to exhibit a load absorption effect under a small load as compared with the elastic body 99, and thus the elastic body 99 disposed therearound preferentially absorbs the load. In this manner, the elastic body 99 absorbs the small guide wheel load.

A material similar to the material of the second elastic body 67 described in the first embodiment can be used as the material of the elastic body 99.

The first air chamber 101 is formed in a ring shape so as to surround the first liquid sealing chamber 93. The first air chamber 101 is disposed near the first tubular member 56. It should be noted that the first air chamber 101 may be disposed around the first liquid sealing chamber 93 and the first air chamber 101 may be configured by, for example, a plurality of air chambers separated from each other.

The second air chamber 102 is formed in a ring shape so as to surround the second liquid sealing chamber 94. The second air chamber 102 is disposed near the first tubular member 56. It should be noted that the second air chamber 102 may be disposed around the second liquid sealing chamber 94 and the second air chamber 102 may be configured by, for example, a plurality of air chambers separated from each other.

According to the guide wheel shock absorbing device 90 of the second embodiment, the elastic body 99 functioning when the guide wheel load is small and the damping mechanism 100 are provided. Accordingly, the guide wheel load can be absorbed by the elastic body 99 in a case where the guide wheel 29 receives a small load and damping can be performed by the damping mechanism 100 in a case where the guide wheel receives a large guide wheel load. As a result, a passenger's ride comfort can be improved.

In addition, by the first stopper portion 92 facing the inner peripheral surface 56a of the first tubular member 56, the first stopper portion 92 and the inner peripheral surface 56a of the first tubular member 56 can be brought into contact with each other in a case where the guide wheel 29 receives a very large guide wheel load or in a case where the elastic body 99 and the damping mechanism 100 fail. As a result, it is possible to suppress a substantial displacement of the position of the guide wheel 29 with respect to the attachment arm 25.

Further, by the elastic body 99 positioned around the first and second liquid sealing chambers 93 and 94 being provided with the first and second air chambers 101 and 102, it is possible to absorb the volume difference during a liquid movement from one liquid sealing chamber to the other liquid sealing chamber and it is possible to suppress an increase in rigidity by the first and second liquid sealing chambers 93 and 94.

It should be noted that a damping force different from the damping force at a time when only one flow path is provided can be obtained by the first and second flow paths 96 and 97 being formed.

Figure 11:
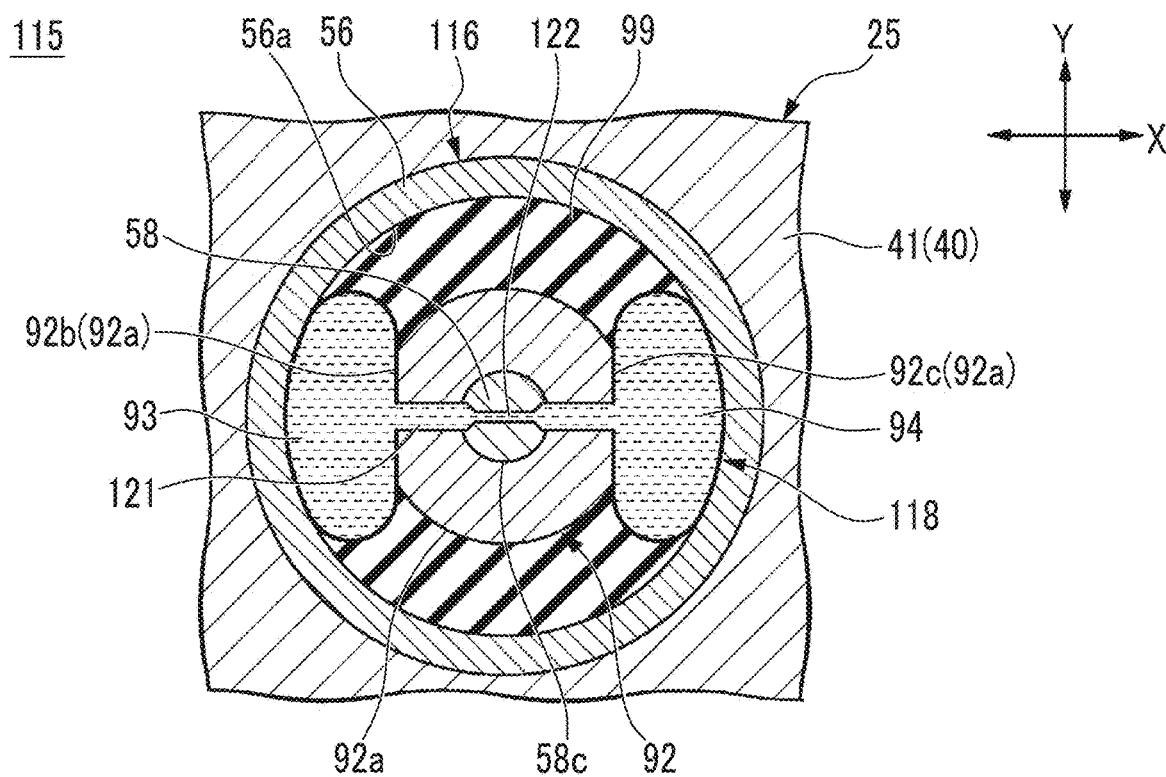
FIG. 11 is a cross-sectional view of a principal section of a guide wheel shock absorbing device according to a first modification example of the second embodiment of the present invention.

Next, a guide wheel shock absorbing device 115 according to a first modification example of the second embodiment will be described with reference to FIG. 11. In FIG. 11, the same components as those of the structure illustrated in FIG. 10 are denoted by the same reference numerals.

The guide wheel shock absorbing device 115 is similar in configuration to the guide wheel shock absorbing device 90 except that the guide wheel shock absorbing device 115 has a shock absorbing elastic portion 116 instead of the shock absorbing elastic portion 91 constituting the guide wheel shock absorbing device 90 of the second embodiment.

The shock absorbing elastic portion 116 is similar in configuration to the shock absorbing elastic portion 91 except that the shock absorbing elastic portion 116 has a damping mechanism 118 instead of the damping mechanism 100.

The damping mechanism 118 is similar in configuration to the damping mechanism 100 except that the damping mechanism 118 has a flow path 121, where a throttle portion 122 is formed, instead of the first and second flow paths 96 and 97 constituting the damping mechanism 100.

The flow path 121 penetrates the first stopper portion 92 and the first shaft body 58 in the X direction so as to connect the central portions of the first and second liquid sealing chambers 93 and 94. The throttle portion 122 is disposed at the center of the flow path 121. The throttle portion 122 is formed in the first shaft body 58.

According to the guide wheel shock absorbing device 115 according to the first modification example of the second embodiment, it is possible to impart resistance to a liquid during passage through the throttle portion 122 as well as the flow path 121, and thus the guide wheel load damping effect can be enhanced.

Figure 12:
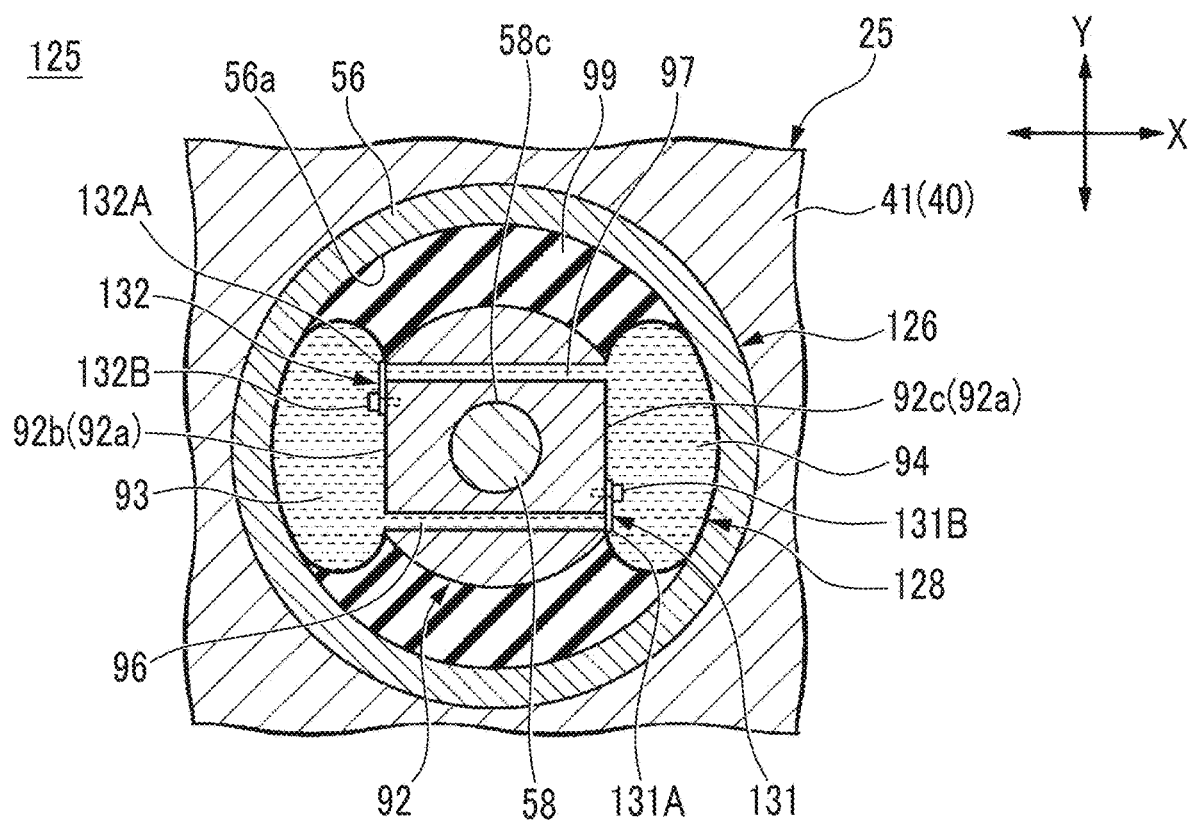
FIG. 12 is a cross-sectional view of a principal section of a guide wheel shock absorbing device according to a second modification example of the second embodiment of the present invention.

Next, a guide wheel shock absorbing device 125 according to a second modification example of the second embodiment will be described with reference to FIG. 12. In FIG. 12, the same components as those of the structure illustrated in FIG. 11 are denoted by the same reference numerals.

The guide wheel shock absorbing device 125 is similar in configuration to the guide wheel shock absorbing device 90 except that the guide wheel shock absorbing device 125 has a shock absorbing elastic portion 126 instead of the shock absorbing elastic portion 91 constituting the guide wheel shock absorbing device 90 of the second embodiment.

The shock absorbing elastic portion 126 is similar in configuration to the shock absorbing elastic portion 91 except that the shock absorbing elastic portion 126 has a damping mechanism 128 instead of the damping mechanism 100.

The damping mechanism 128 is similar in configuration to the damping mechanism 100 except that the damping mechanism 100 is further provided with first and second valves 131 and 132.

The first valve 131 has a first leaf spring 131A and a bolt 131B.

The first leaf spring 131A is disposed on the liquid sealing chamber placement surface 92c so as to have a part facing the end of the first flow path 96 that communicates with the second liquid sealing chamber 94.

The bolt 131B fixes the first leaf spring 131A to the liquid sealing chamber placement surface 92c.

The first leaf spring 131A is opened when the pressure of the liquid that flows through the first flow path 96 in the direction from the first liquid sealing chamber 93 toward the second liquid sealing chamber 94 exceeds a predetermined pressure. The first leaf spring 131A remains closed otherwise.

The second valve 132 has a second leaf spring 132A and a bolt 132B.

The second leaf spring 132A is disposed on the liquid sealing chamber placement surface 92b so as to have a part facing the end of the second flow path 97 that communicates with the first liquid sealing chamber 93.

The bolt 132B fixes the second leaf spring 132A to the liquid sealing chamber placement surface 92b in a state where the second leaf spring 132A can be opened and closed.

The second leaf spring 132A is opened when the pressure of the liquid that flows through the second flow path 97 in the direction from the second liquid sealing chamber 94 toward the first liquid sealing chamber 93 exceeds a predetermined pressure. The second leaf spring 132A remains closed otherwise.

According to the guide wheel shock absorbing device 125 according to the second modification example of the second embodiment, the first and second valves 131 and 132 are provided, and thus the first and second valves 131 and 132 function as resistance when a liquid opens the first and second valves 131 and 132 (specifically, the first and second leaf springs 131A and 132A). Accordingly, a large damping force can be obtained as compared with a case where only the first and second flow paths 96 and 97 are provided.

In addition, the first flow path 96 can be used as a flow path for supplying the liquid in the first liquid sealing chamber 93 to the second liquid sealing chamber 94 and the second flow path 97 can be used as a flow path for supplying the liquid in the second liquid sealing chamber 94 to the first liquid sealing chamber 93.

Further, the first and second valves 131 and 132 can be used as check valves by the first and second valves 131 and 132 configured as described above being used.

It should be noted that the first and second leaf springs 131A and 132A may be different in rigidity from each other in the guide wheel shock absorbing device 125.

The damping force with respect to the branch wheel load and the damping force with respect to the main guide wheel load can be different from each other by the first and second leaf springs 131A and 132A being different in rigidity from each other as described above.

Figure 13:
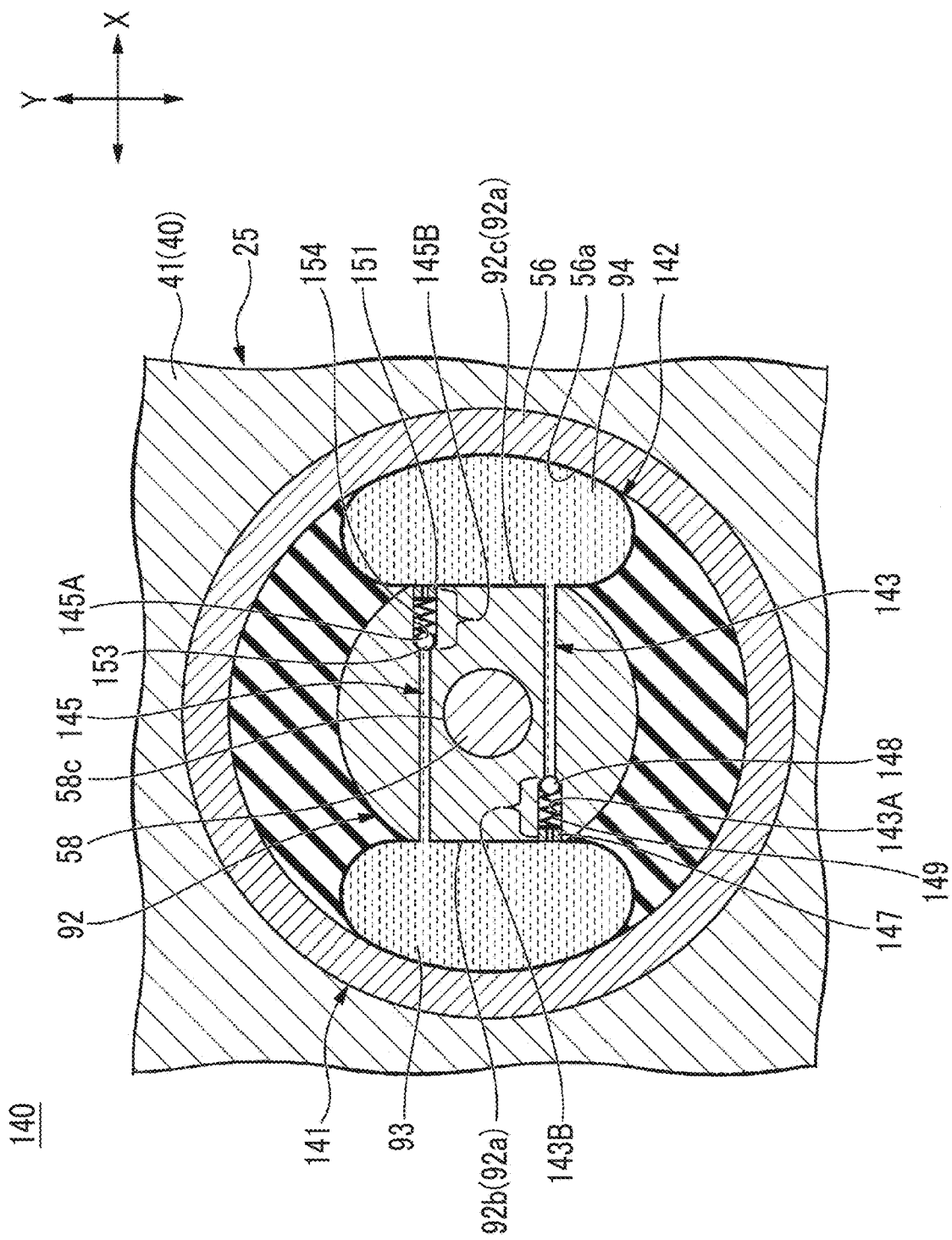
FIG. 13 is a cross-sectional view of a principal section of a guide wheel shock absorbing device according to a third modification example of the second embodiment of the present invention.

Next, a guide wheel shock absorbing device 140 according to a third modification example of the second embodiment will be described with reference to FIG. 13. In FIG. 13, the same components as those of the structure illustrated in FIG. 11 are denoted by the same reference numerals.

The guide wheel shock absorbing device 140 is similar in configuration to the guide wheel shock absorbing device 90 except that the guide wheel shock absorbing device 140 has a shock absorbing elastic portion 141 instead of the shock absorbing elastic portion 91 constituting the guide wheel shock absorbing device 90 of the second embodiment.

The shock absorbing elastic portion 141 is similar in configuration to the shock absorbing elastic portion 91 except that the shock absorbing elastic portion 141 has a damping mechanism 142 instead of the damping mechanism 100.

The damping mechanism 142 is similar in configuration to the damping mechanism 100 except that the damping mechanism 142 is provided with first and second flow paths 143 and 145 instead of the first and second flow paths 96 and 97 constituting the damping mechanism 100 and the damping mechanism 142 further has a first throttle portion 147, a first member 148, a first spring 149, a second throttle portion 151, a second member 153, and a second spring 154.

The first flow path 143 is provided in the first stopper portion 92 in a state where the first liquid sealing chamber 93 and the second liquid sealing chamber 94 are capable of communicating with each other in the X direction.

The first flow path 143 has a first large-diameter portion 143A constituting an end portion 143B of the first flow path 143 positioned on the first liquid sealing chamber 93 side and larger in diameter than the other part.

The second flow path 145 is provided in the first stopper portion 92 in a state where the first liquid sealing chamber 93 and the second liquid sealing chamber 94 are capable of communicating with each other in the X direction.

The second flow path 145 has a second large-diameter portion 145A constituting an end portion 145B of the second flow path 145 positioned on the second liquid sealing chamber 94 side and larger in diameter than the other part.

The first throttle portion 147 is formed at the end of the first large-diameter portion 143A that is positioned on the first liquid sealing chamber 93 side.

The first member 148 is disposed in the first large-diameter portion 143A. The first member 148 is a member that is movable in the first large-diameter portion 143A and is larger than the inner diameter of the other part of the first flow path 143. A spherical member or the like can be used as the first member 148.

The first spring 149 is disposed between the first member 148 and the first throttle portion 147 in the first large-diameter portion 143A.

Here, the operation of the structure including the first throttle portion 147, the first member 148, and the first spring 149 will be exemplified.

In a case where the guide wheel 29 (see FIG. 3) receives a large guide wheel load and the second liquid sealing chamber 94 is pushed in the direction toward the first shaft body 58, the liquid in the second liquid sealing chamber 94 moves in the first flow path 143 in the direction toward the first liquid sealing chamber 93.

Then, when the pressure of the liquid flowing through the first flow path 143 exceeds a predetermined pressure, a gap is formed between the first flow path 143 and the first member 148 and the liquid flows into the first large-diameter portion 143A. Subsequently, the liquid is supplied to the first liquid sealing chamber 93 via the first throttle portion 147.

In this case, the damping mechanism 142 attenuates the guide wheel load when the liquid passes through the first flow path 143 except for the first large-diameter portion 143A and the first throttle portion 147.

The second throttle portion 151 is fixed to the end of the second large-diameter portion 145A that is positioned on the second liquid sealing chamber 94 side. The second member 153 is disposed in the second large-diameter portion 145A. The second member 153 is a member that is movable in the second large-diameter portion 145A and is larger than the inner diameter of the other part of the second flow path 145. A spherical member or the like can be used as the second member 153.

The second spring 154 is disposed between the second member 153 and the second throttle portion 151 in the second large-diameter portion 145A.

The structure including the second throttle portion 151, the second member 153, and the second spring 154 is similar in operation to the above-described structure including the first throttle portion 147, the first member 148, and the first spring 149.

According to the guide wheel shock absorbing device 140 according to the third modification example of the second embodiment, the shock absorbing elastic portion 141 includes the damping mechanism 142 described above, and thus the guide wheel load damping effect can be enhanced as compared with a case where only the first and second flow paths having constant inner diameters are provided.

It should be noted that the first and second springs 149 and 154 may be different in rigidity from each other in the guide wheel shock absorbing device 140.

The damping force with respect to the branch wheel load and the damping force with respect to the main guide wheel load can be different from each other by the first and second springs 149 and 154 being different in rigidity from each other as described above.

Third Embodiment

Figure 5:
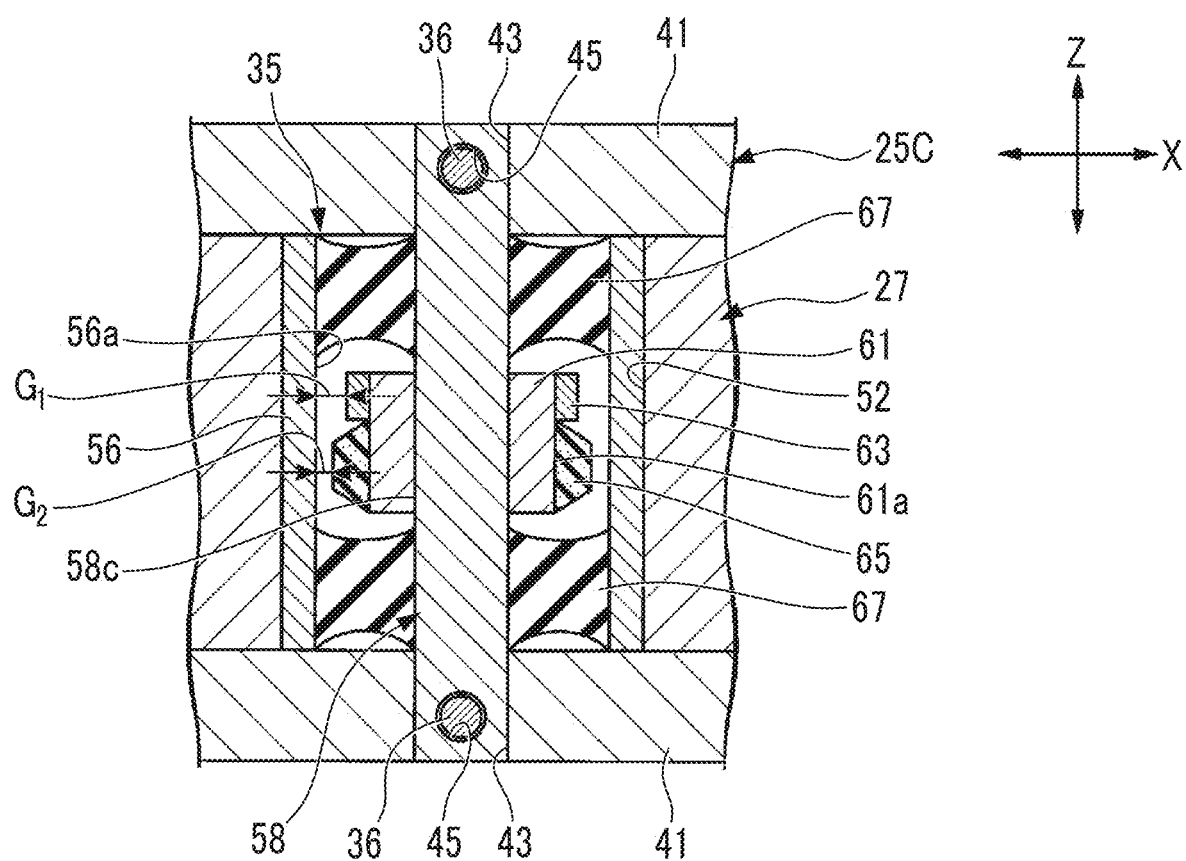
FIG. 5 is a cross-sectional view of the guide wheel shock absorbing device in FIG. 2 taken along line E1-E2.
Figure 6:
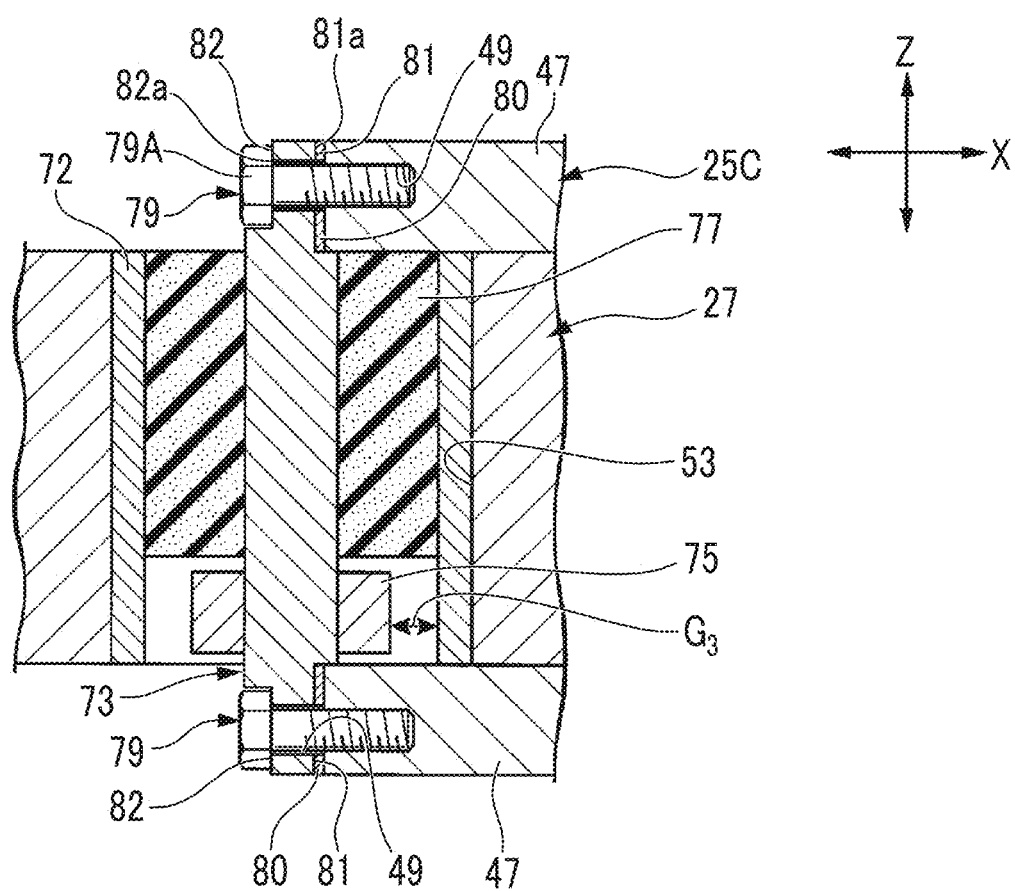
FIG. 6 is a cross-sectional view of the guide wheel shock absorbing device in FIG. 2 taken along line F1-F2.
Figure 7:
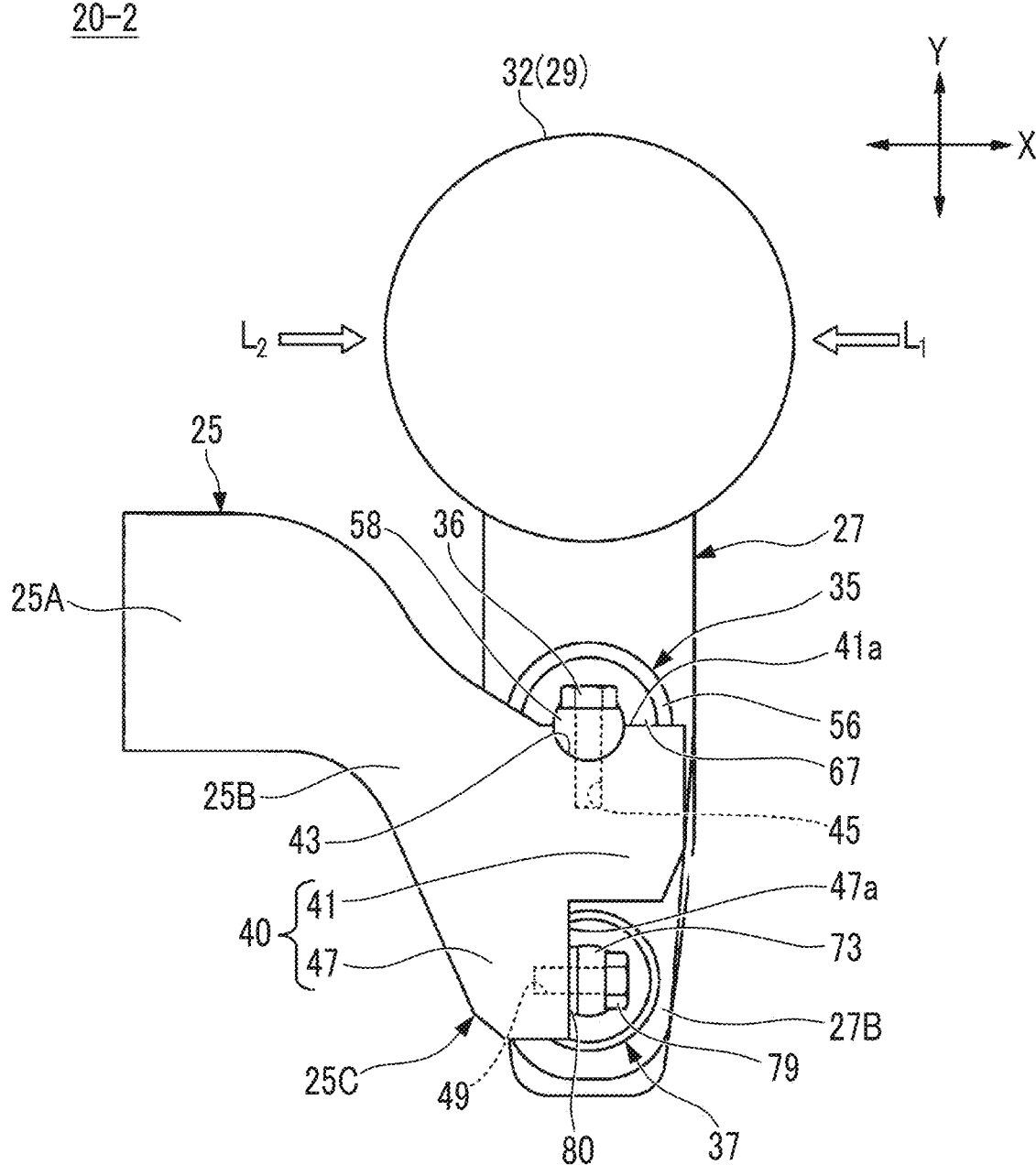
FIG. 7 is a plan view of the other guide wheel shock absorbing device illustrated in FIG. 1 as viewed from B.
Figure 14:
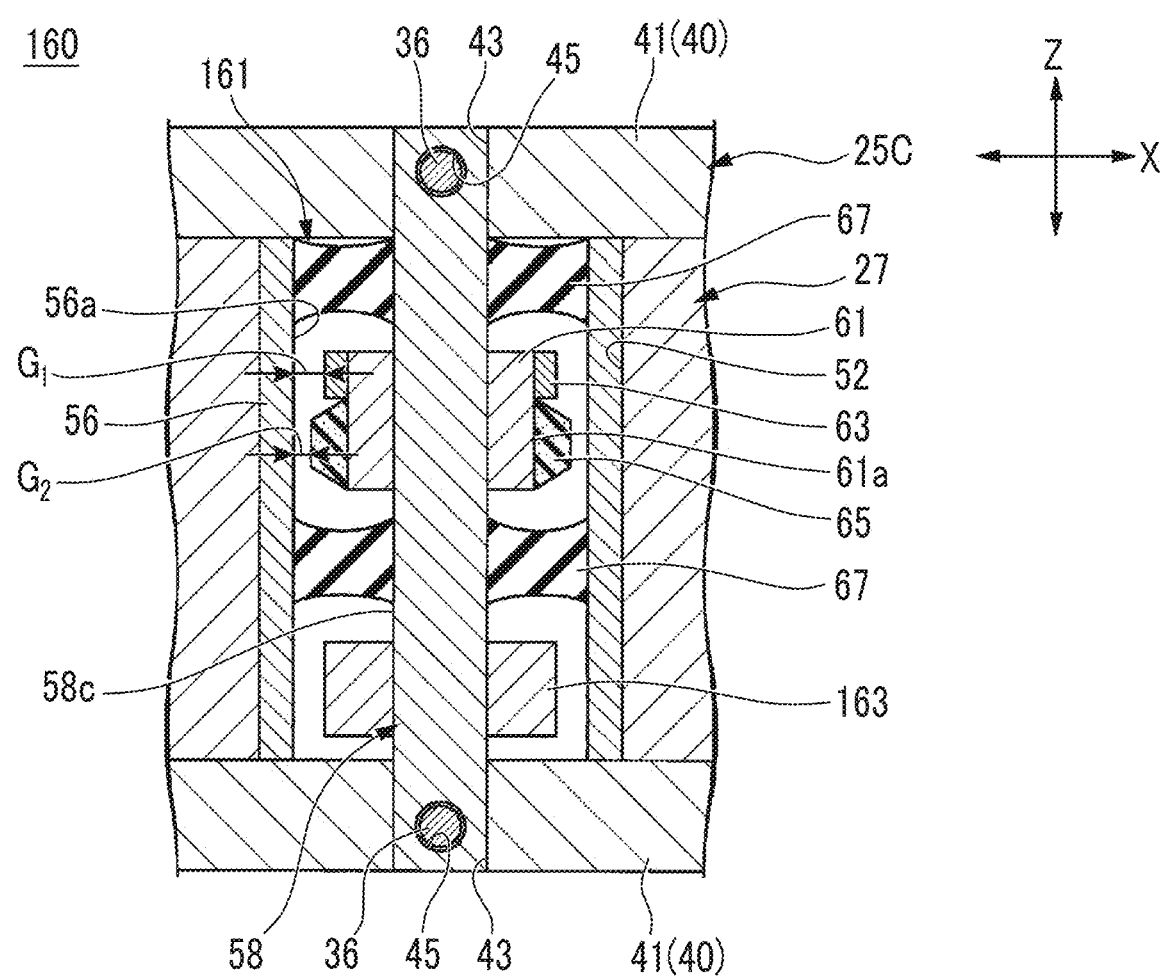
FIG. 14 is a cross-sectional view of a principal section of a guide wheel shock absorbing device according to a third embodiment of the present invention.

Next, a guide wheel shock absorbing device 160 according to a third embodiment of the present invention will be described with reference to FIG. 14. In FIG. 14, the same components as those of the structure illustrated in FIG. 5 are denoted by the same reference numerals.

The guide wheel shock absorbing device 160 is similar in configuration to the guide wheel shock absorbing devices 20-1 and 20-2 except that the guide wheel shock absorbing device 160 has a shock absorbing elastic portion 161 instead of the shock absorbing elastic portion 35 constituting the guide wheel shock absorbing devices 20-1 and 20-2 of the first embodiment.

The shock absorbing elastic portion 161 is similar in configuration to the shock absorbing elastic portion 35 except that a ring-shaped second stopper portion 163 is provided on the outer peripheral surface 58c of the first shaft body 58 positioned between the second elastic body 67 and the first protrusion portion 41.

According to the guide wheel shock absorbing device 160 according to the third embodiment, the second stopper portion 163 is provided, and thus a substantial displacement of the position of the guide wheel 29 (see FIG. 3) with respect to the attachment arm 25 (see FIG. 2) can be suppressed even in a case where a very large guide wheel load is received.

It should be noted that the second stopper portion 163 may be provided above the first shaft body 58 although a case where the second stopper portion 163 is provided below the first shaft body 58 has been described as an example in the third embodiment.

Next, a guide wheel shock absorbing device 170 according to a modification example of the third embodiment of the present invention will be described with reference to FIG.

Figure 15:
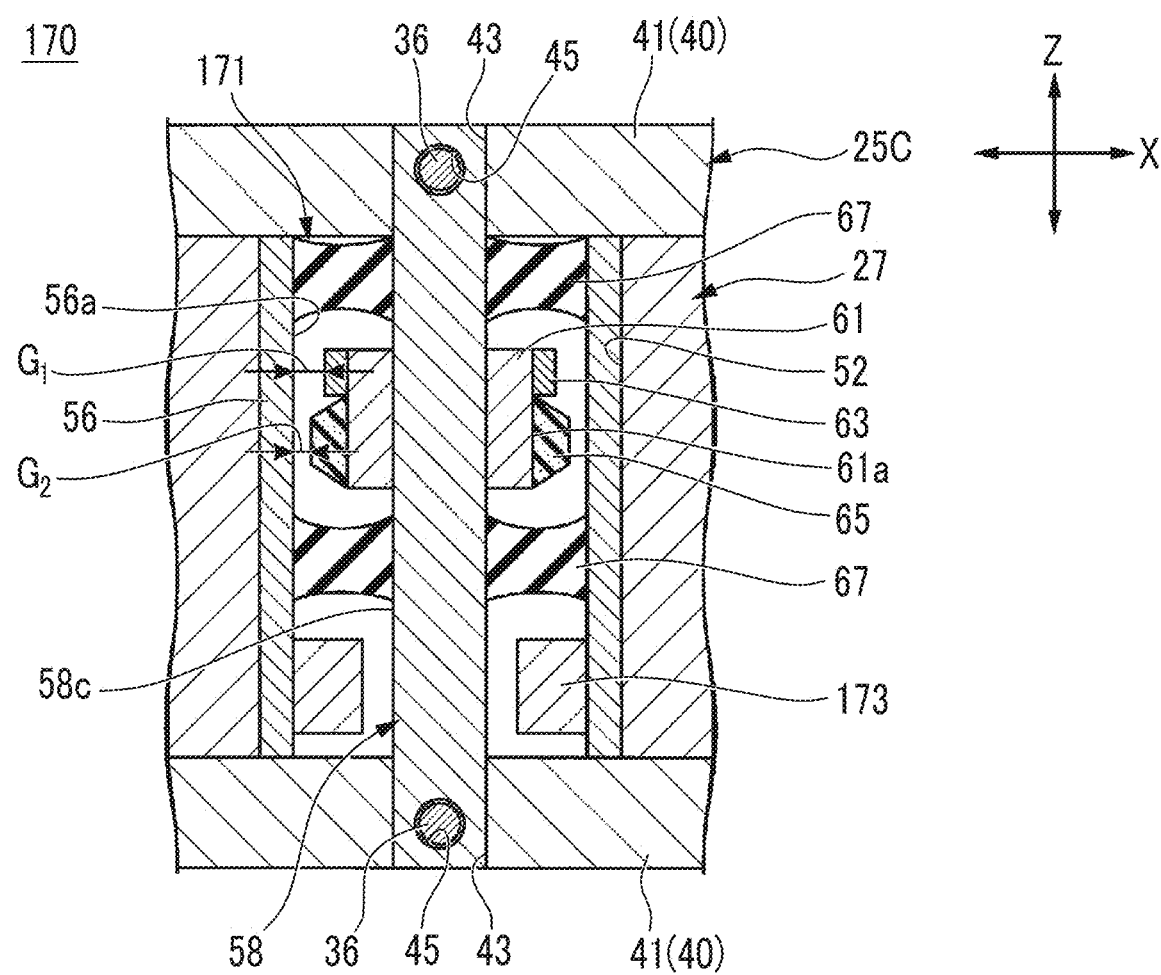
FIG. 15 is a cross-sectional view of a principal section of a guide wheel shock absorbing device according to a modification example of the third embodiment of the present invention.

15. In FIG. 15, the same components as those of the structure illustrated in FIG. 5 are denoted by the same reference numerals.

The guide wheel shock absorbing device 170 is similar in configuration to the guide wheel shock absorbing devices 20-1 and 20-2 except that the guide wheel shock absorbing device 170 has a shock absorbing elastic portion 171 instead of the shock absorbing elastic portion 35 constituting the guide wheel shock absorbing devices 20-1 and 20-2 of the first embodiment.

The shock absorbing elastic portion 171 is similar in configuration to the shock absorbing elastic portion 35 except that a ring-shaped second stopper portion 173 is provided on the inner peripheral surface 56a of the first tubular member 56 positioned between the second elastic body 67 and the first protrusion portion 41.

According to the guide wheel shock absorbing device 170 according to the modification example of the third embodiment, the second stopper portion 173 is provided, and thus a substantial displacement of the position of the guide wheel 29 (see FIG. 3) with respect to the attachment arm 25 (see FIG. 2) can be suppressed even in a case where a very large guide wheel load is received.

It should be noted that the second stopper portion 173 may be provided above the first tubular member 56 although a case where the second stopper portion 173 is provided below the first tubular member 56 has been described as an example in FIG. 15.

In addition, the second stopper portions 163 and 173 described above may be applied to the guide wheel shock absorbing devices 90, 115, 125, and 140 described above.

Figure 16:
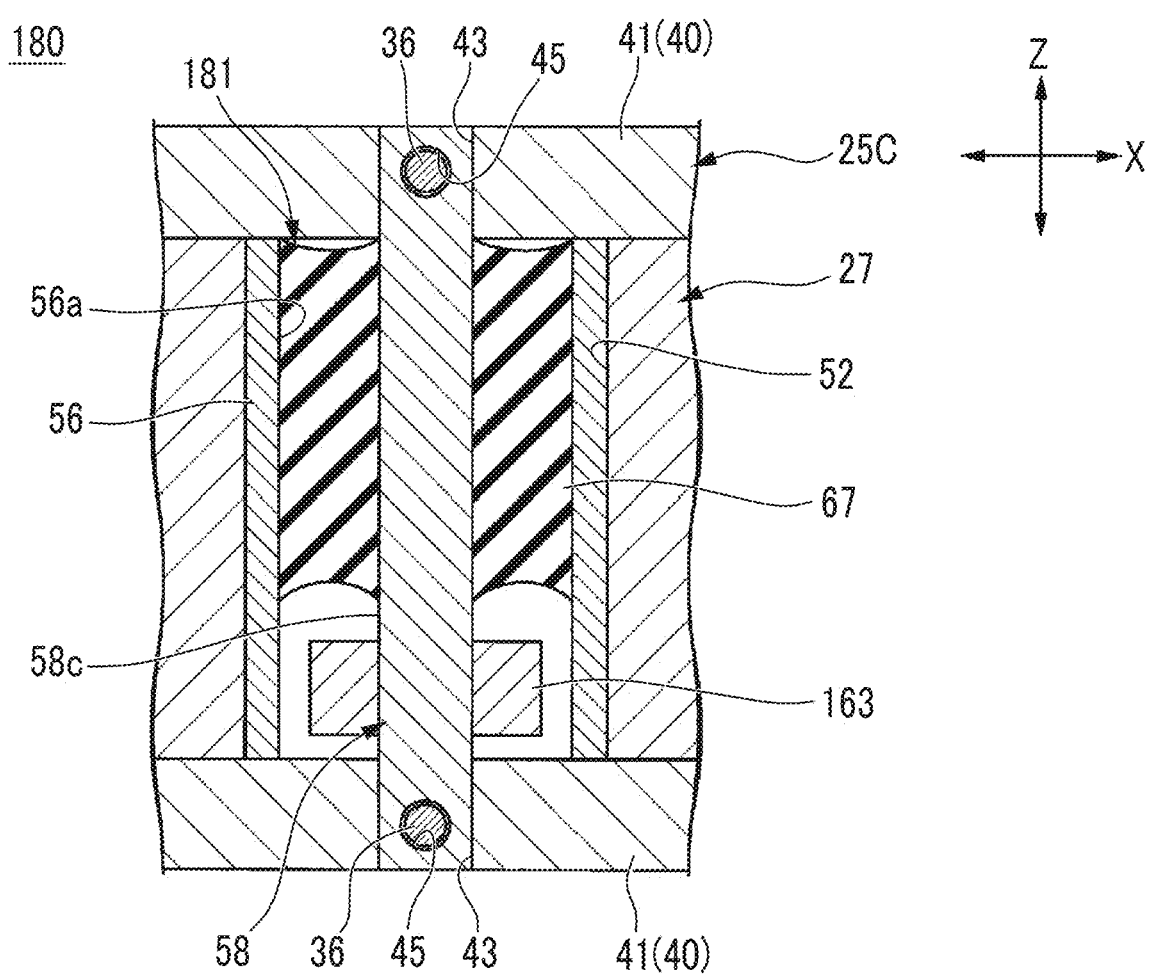
FIG. 16 is a cross-sectional view for describing another application example of a second stopper portion.

Here, another application example of the second stopper portion 163 will be described with reference to FIG. 16. In FIG. 16, the same components as those of the structure illustrated in FIG. 14 are denoted by the same reference numerals.

As in a guide wheel shock absorbing device 180 illustrated in FIG. 16, the second stopper portion 163 may be applied to a shock absorbing elastic portion 181 that does not have the distance adjustment member 61, the first stopper portion 63, and the first elastic body 65. Alternatively, the second stopper portion 173 may be applied.

Although preferred embodiments of the present invention have been described in detail above, the present invention is not limited to such specific embodiments and various modifications and changes are possible within the scope of the present invention described in the claims.

Figure 17:
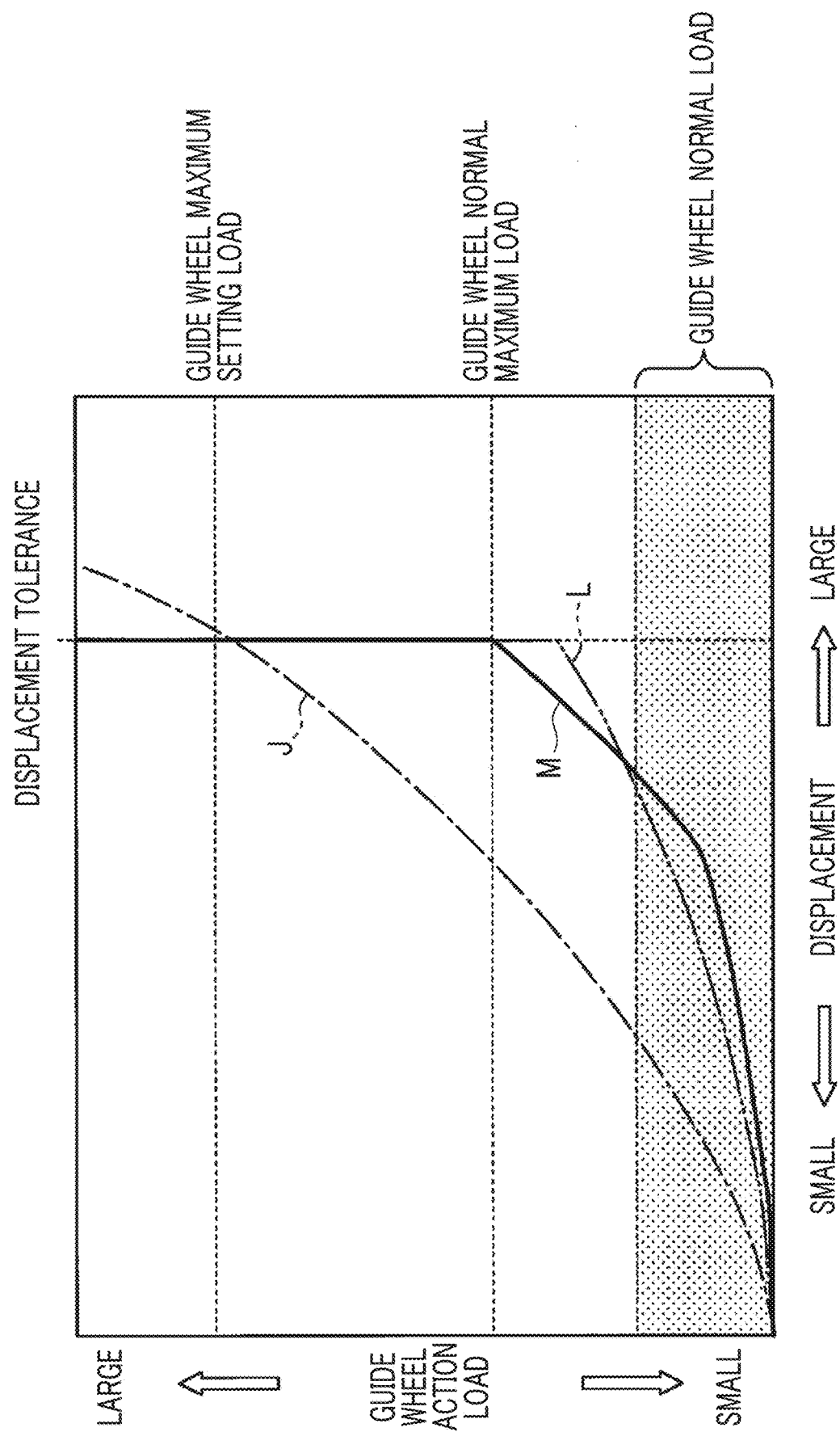
FIG. 17 is a graph illustrating the result of Experimental Example 1.

Here, the relationship between the guide wheel load and the displacement in a case where four guide wheel shock absorbing devices are used will be exemplified with reference to FIG. 17.

In FIG. 17, J is the result in a case where hard rubber is used as the shock absorbing body of the shock absorbing elastic portion of the guide wheel shock absorbing device described in PTL 1, L is the result in a case where the guide wheel shock absorbing device 180 illustrated in FIG. 16 is used (case where rubber considerably softer than the rubber used when the result of J is obtained is used), and M is the result in a case where the guide wheel shock absorbing device 20-1 is used (case where rubber considerably softer than the rubber used when the result of J is obtained is used).

Referring to the result of J in FIG. 17, a displacement tolerance may be exceeded due to the lack of a stopper portion in a case where the guide wheel shock absorbing device described in PTL 1 is used. On the other hand, referring to the results of L and M, it is possible to use soft rubber by using the guide wheel shock absorbing devices 20-1 and 180 having the first stopper portion 63, and thus the guide wheel action load at the same displacement can be smaller than in J while a displacement tolerance being exceeded is reliably avoided.

Figure 18:
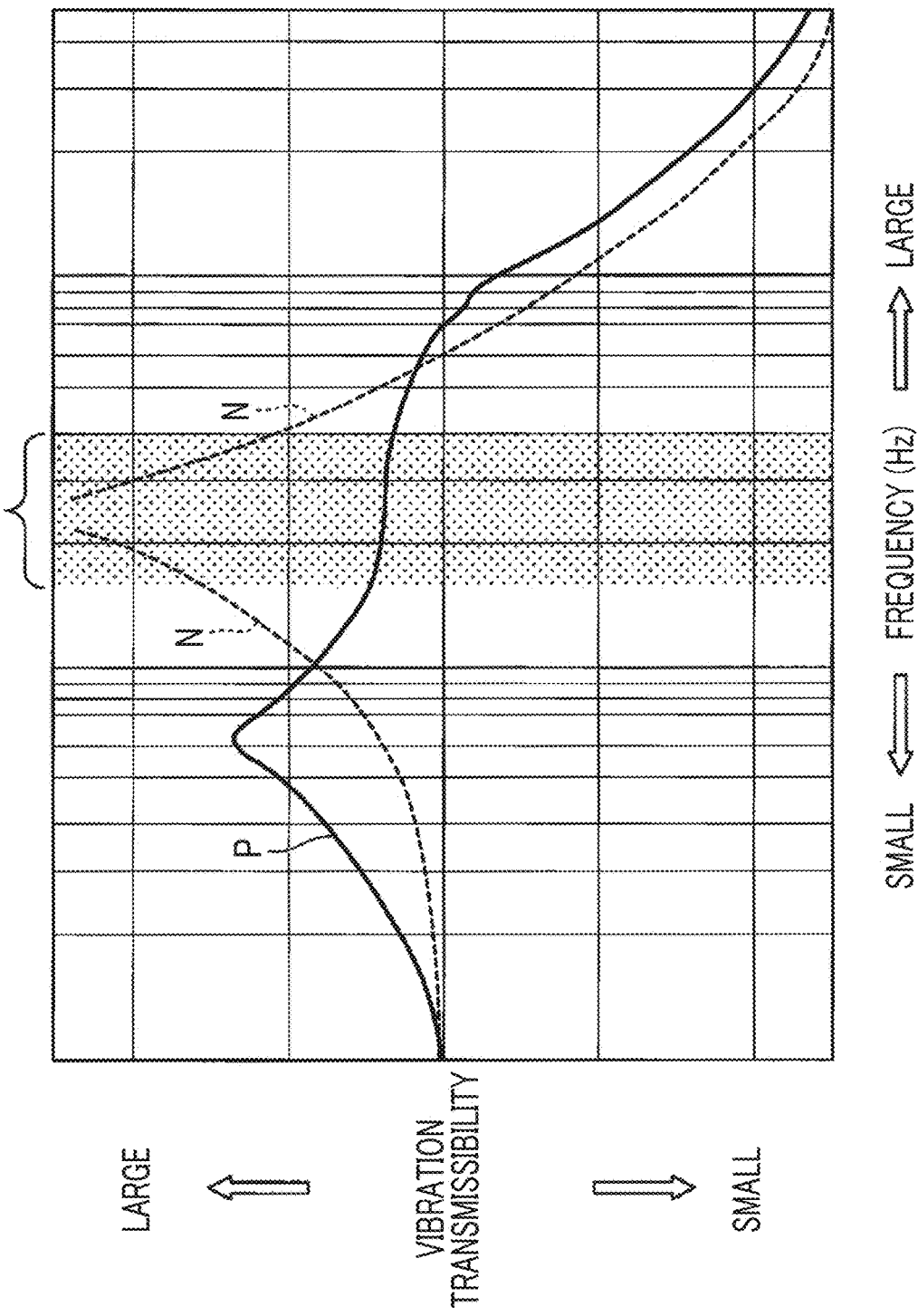
FIG. 18 is a graph illustrating the result of Experimental Example 2.

Next, the vibration transmissibility-frequency relationship in a case where the rubber used in the guide wheel shock absorbing device of PTL 1 and the shock absorbing elastic portion 91 of the guide wheel shock absorbing device 90 illustrated in FIG. 9 are used will be exemplified with reference to FIG. 18. In FIG. 18, N indicates the vibration characteristics of the rubber used in the guide wheel shock absorbing device of PTL 1 and P indicates the vibration characteristics of the shock absorbing elastic portion 91 used in the guide wheel shock absorbing device 90 illustrated in FIG. 9.

Referring to FIG. 18, due to the peak of the vibration characteristics in the case of PTL 1, the guide wheel shock absorbing mechanism resonates with the guide rail, the left-right vibration of the vehicle is amplified, the ride comfort deteriorates, and abnormal noise is generated between the guide wheel shock absorbing mechanism and the guide rail.

On the other hand, in the case of the shock absorbing elastic portion 91, it becomes possible to shift the peak of the vibration characteristics to the lower frequency side so as to avoid the frequency at which abnormal noise is generated. In addition, in the case of the shock absorbing elastic portion 91, the damping effect of the liquid flowing through the first and second flow paths 96 and 97 allows vibration transmission to be reduced, a guide wheel vibration phenomenon to be suppressed, and traveling stability to be ensured for the vehicle.

INDUSTRIAL APPLICABILITY

This invention is applicable to a guide wheel shock absorbing device, a carriage, and a vehicle.

REFERENCE SIGNS LIST

3 Main guide rail
4 Branch guide rail
5 Guide rail
7 Track
8 Traveling path
10 Vehicle
11 Vehicle body
13 Carriage
15 Traveling wheel
18 Guide frame
20-1, 20-2, 90, 115, 125, 140, 160, 170, 180 Guide wheel shock absorbing device
22 Cross beam
22A, 22B End portion
25 Attachment arm
25A Base end portion
25B Connecting portion
25C Tip portion
27 Shock absorbing link
27A One end portion
27B The other end portion
28 Shaft body
29 Guide wheel
30 Guide wheel support portion
32 Main guide wheel
32a, 33a, 58c, 61a, 92a Outer peripheral surface
33 Branch wheel 35, 91, 116, 126, 141, 161, 171, 181 Shock absorbing elastic portion
36 First bolt
36A, 79A Head portion
37 Shock absorbing link support portion
40 Plate-shaped member
41 First protrusion portion
41a, 47a Surface
43 Notch portion
45 First bolt hole
47 Second protrusion portion
49 Second bolt hole
51 Through-hole
52 First hole
53 Second hole
56 First tubular member
58 First shaft body
58a, 58b Abutment surface
58c Outer peripheral surface
58A, 58B Bolt notch portion
61 Distance adjustment member
61a Outer peripheral surface
63, 92 First stopper portion
65 First elastic body
67 Second elastic body
72 Second tubular member
73 Second shaft body
75 Third stopper portion
77 Third elastic body
79 Second bolt
80 Adjustment liner
81 Abutment notch portion
81a, 82a Flat surface
82 Bolt notch portion
92b, 92c Liquid sealing chamber placement surface
93 First liquid sealing chamber
94 Second liquid sealing chamber
96, 143 First flow path
97, 145 Second flow path
99 Elastic body
100, 118, 128, 142 Damping mechanism
101 First air chamber
102 Second air chamber
121 Flow path
122 Throttle portion
131 First valve
131A First leaf spring
131B, 132B Bolt
132A Second leaf spring
132 Second valve
143A First large-diameter portion
143B, 145B End portion
145A Second large-diameter portion
147 First throttle portion
148 First member
149 First spring
151 Second throttle portion
153 Second member
154 Second spring
163, 173 Second stopper portion
L1 Main guide wheel load
L2 Branch wheel load
G1 First gap
G2 Second gap
G3 Third gap

The invention claimed is:

1. A guide wheel shock absorbing device comprising:
an attachment arm connected to a guide frame disposed below a vehicle body of a vehicle;
a shock absorbing link provided on the attachment arm and extending in one direction;
a shock absorbing link support portion provided on the shock absorbing link and supporting the shock absorbing link in a state of being oscillatable with respect to the attachment arm;
a guide wheel receiving a frictional force and rolling by coming into contact with a guide rail laid on a traveling track of the vehicle;
a guide wheel support portion provided on the shock absorbing link and supporting the guide wheel in a rotatable state; and
a shock absorbing elastic portion elastically supporting the shock absorbing link with respect to the attachment arm,
wherein the shock absorbing elastic portion has a plurality of shock absorbing bodies different in displacement or displacement speed with respect to a load received by the guide wheel, and
wherein the plurality of shock absorbing bodies include a first elastic body and a second elastic body separated from the first elastic body, the first and second elastic bodies each supporting the shock absorbing link with respect to the attachment arm.

2. The guide wheel shock absorbing device according to claim 1, wherein
the shock absorbing elastic portion includes:
a first tubular member provided in a first hole penetrating the shock absorbing link;
a first shaft body inserted into the first tubular member and fixed to the attachment arm;
a distance adjustment member provided on a surface of an outer peripheral surface of the first shaft body, the surface facing an inner peripheral surface of the first tubular member;
the first elastic body provided on an outer peripheral surface of the distance adjustment member facing the inner peripheral surface of the first tubular member and protruding to an inner peripheral surface side of the first tubular member; and
the second elastic body provided so as to interconnect the outer peripheral surface of the first shaft body and the inner peripheral surface of the first tubular member,
and
the first elastic body is higher in rigidity than the second elastic body.

3. The guide wheel shock absorbing device according to claim 2, further comprising a first stopper portion provided at a part of a surface of the distance adjustment member and protruding to the inner peripheral surface side of the first tubular member,
wherein the first stopper portion is smaller in protrusion amount than the first elastic body.

4. The guide wheel shock absorbing device according to claim 3, wherein
a shape of the distance adjustment member is a ring shape circumferentially surrounding the outer peripheral surface of the first shaft body, and
a shape of the first stopper portion and a shape of the first elastic body are ring shapes surrounding the outer peripheral surface of the distance adjustment member.

5. The guide wheel shock absorbing device according to claim 3, wherein a second stopper portion is provided on the outer peripheral surface of the first shaft body facing the inner peripheral surface of the first tubular member or the inner peripheral surface of the first tubular member.

6. The guide wheel shock absorbing device according to claim 2, wherein
a notch portion is formed in the attachment arm,
the notch portion accommodates a part of the first shaft body in a state of being in contact with a part of an outer peripheral surface of an end portion of the first shaft body, and
the guide wheel shock absorbing device further comprises a first bolt fixing the first shaft body to the attachment arm from a direction orthogonal to a direction in which the guide wheel receives a load.

7. The guide wheel shock absorbing device according to claim 2, wherein
the shock absorbing link support portion includes:
a second tubular member inserted into a second hole penetrating the shock absorbing link;
a second shaft body inserted into the second tubular member and fixed to the attachment arm;
a third stopper portion provided on an outer peripheral surface of the second shaft body facing an inner peripheral surface of the second tubular member or the inner peripheral surface of the second tubular member;
a third elastic body provided between the second shaft body and the second tubular member and interconnecting the second shaft body and the second tubular member; and
the second elastic body provided so as to interconnect the outer peripheral surface of the first shaft body and the inner peripheral surface of the first tubular member, and
the guide wheel shock absorbing device further comprises a second bolt fixing the second shaft body to the shock absorbing link from a direction orthogonal to a direction in which the guide wheel receives a load.

8. A carriage comprising the guide wheel shock absorbing device according to claim 1.

9. A vehicle comprising:
the carriage according to claim 8; and
the vehicle body provided on the carriage.

10. A guide wheel shock absorbing device comprising:
an attachment arm connected to a guide frame disposed below a vehicle body of a vehicle;
a shock absorbing link provided on the attachment arm and extending in one direction;
a shock absorbing link support portion provided on the shock absorbing link and supporting the shock absorbing link in a state of being oscillatable with respect to the attachment arm;
a guide wheel receiving a frictional force and rolling by coming into contact with a guide rail laid on a traveling track of the vehicle;
a guide wheel support portion provided on the shock absorbing link and supporting the guide wheel in a rotatable state; and
a shock absorbing elastic portion elastically supporting the shock absorbing link with respect to the attachment arm, wherein
the shock absorbing elastic portion has a plurality of shock absorbing bodies different in displacement or displacement speed with respect to a load received by the guide wheel,
the shock absorbing elastic portion includes:
a first tubular member provided in a first hole penetrating the shock absorbing link;
a first shaft body inserted into the first tubular member and fixed to the attachment arm;
a pair of liquid sealing chambers provided in the first hole and filled with a liquid;
a flow path formed so as to connect the pair of liquid sealing chambers, the liquid flowing through the flow path; and
an elastic body provided so as to interconnect an outer peripheral surface of the first shaft body and an inner peripheral surface of the first tubular member, and
the plurality of shock absorbing bodies include
the elastic body absorbing the load when the load is small and
a damping mechanism including the pair of liquid sealing chambers and the flow path and absorbing a large load unabsorbable by the elastic body.

11. The guide wheel shock absorbing device according to claim 10, further comprising a first stopper portion provided on a surface of the outer peripheral surface of the first shaft body, the surface facing the inner peripheral surface of the first tubular member.

12. The guide wheel shock absorbing device according to claim 10, further comprising an air chamber formed in the elastic body positioned around each liquid sealing chamber constituting the pair of liquid sealing chambers.

13. The guide wheel shock absorbing device according to claim 10, wherein the pair of liquid sealing chambers are disposed so as to face each other in a direction in which the guide wheel receives a load.

14. The guide wheel shock absorbing device according to claim 10, wherein a throttle portion is formed in the flow path.

15. The guide wheel shock absorbing device according to claim 10, wherein the flow path has first and second flow paths connecting the pair of liquid sealing chambers.

16. The guide wheel shock absorbing device according to claim 15, wherein
the pair of liquid sealing chambers have a first liquid sealing chamber and a second liquid sealing chamber, and
the guide wheel shock absorbing device comprises:
a first valve opening and closing an end of the first flow path communicating with the second liquid sealing chamber; and
a second valve opening and closing an end of the second flow path communicating with the first liquid sealing chamber.

17. The guide wheel shock absorbing device according to claim 16, wherein
the first valve is opened by the liquid flowing through the first flow path in a direction from the first liquid sealing chamber toward the second liquid sealing chamber, and
the second valve is opened by the liquid flowing through the second flow path in a direction from the second liquid sealing chamber toward the first liquid sealing chamber.

18. The guide wheel shock absorbing device according to claim 16, wherein
- the first valve has a first leaf spring opening and closing the end of the first flow path,
- the second valve has a second leaf spring opening and closing the end of the second flow path, and
- the first and second leaf springs are different in rigidity from each other.

19. The guide wheel shock absorbing device according to claim 15, wherein
- the pair of liquid sealing chambers have a first liquid sealing chamber and a second liquid sealing chamber, and
- the first flow path has a first large-diameter portion formed in an end portion on a first liquid sealing chamber side and larger in diameter than another portion of the first flow path,
- the second flow path has a second large-diameter portion formed in an end portion on a second liquid sealing chamber side and larger in diameter than another portion of the second flow path, and
- the guide wheel shock absorbing device comprises:
  - a first member disposed in the first large-diameter portion, movable in the first large-diameter portion, and larger than an inner diameter of the another portion of the first flow path;
  - a first throttle portion formed at an end of the first large-diameter portion on the first liquid sealing chamber side;
  - a first spring disposed between the first member and the first throttle portion in the first large-diameter portion;
  - a second member disposed in the second large-diameter portion, movable in the second large-diameter portion, and larger than an inner diameter of the another portion of the second flow path;
  - a second throttle portion formed at an end of the second large-diameter portion on the second liquid sealing chamber side; and
  - a second valve opening and closing an end of the second flow path communicating with the first liquid sealing chamber.

20. The guide wheel shock absorbing device according to claim 19, further comprising a second spring, wherein the first and second springs are different in rigidity from each other.

* * * * *